US009999009B1

(12) United States Patent
Zhang et al.

(10) Patent No.: US 9,999,009 B1
(45) Date of Patent: Jun. 12, 2018

(54) SIMULTANEOUS UPLINK TRANSMISSION IN A WIRELESS NETWORK

(71) Applicant: Marvell International Ltd., Hamilton (BM)

(72) Inventors: Hongyuan Zhang, Fremont, CA (US); Rohit U. Nabar, Sunnyvale, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 40 days.

(21) Appl. No.: 14/992,849

(22) Filed: Jan. 11, 2016

Related U.S. Application Data

(63) Continuation of application No. 14/065,175, filed on Oct. 28, 2013, now Pat. No. 9,237,538, which is a continuation of application No. 12/840,260, filed on Jul. 20, 2010, now Pat. No. 8,571,010.
(Continued)

(51) Int. Cl.
*H04W 4/00* (2018.01)
*H04W 56/00* (2009.01)
(Continued)

(52) U.S. Cl.
CPC ...... *H04W 56/0005* (2013.01); *H04B 7/0413* (2013.01); *H04L 1/0004* (2013.01); *H04W 72/1278* (2013.01)

(58) Field of Classification Search
CPC ...... H04L 1/1621; H04L 47/36; H04W 56/00; H04W 56/001; H04W 28/065; H04W 72/1268; H04W 72/1289; H04B 7/0413
See application file for complete search history.

(56) References Cited

U.S. PATENT DOCUMENTS

| 5,933,787 A | 8/1999 | Gilhousen et al. |
| 6,108,782 A * | 8/2000 | Fletcher ............... G06F 8/65 370/245 |

(Continued)

FOREIGN PATENT DOCUMENTS

WO    WO-2005039105    4/2005

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
(Continued)

*Primary Examiner* — David Oveissi

(57) ABSTRACT

A synchronization data unit is generated by an access point. The synchronization data unit is for scheduling subsequent simultaneous transmission of a plurality of data units by multiple communication devices. An estimate of a MIMO communication channel is generated using a plurality of training fields included in a first portion of a signal, wherein the signal corresponds to the plurality of data units transmitted simultaneously from the respective communication devices via respective sets of sets of spatial streams. Data in a second portion of the signal is decoded using the estimate of the MIMO communication channel, wherein the data in the second portion of the signal corresponds to data included in the plurality of data units.

18 Claims, 17 Drawing Sheets

Related U.S. Application Data

(60) Provisional application No. 61/254,256, filed on Oct. 23, 2009, provisional application No. 61/230,619, filed on Jul. 31, 2009, provisional application No. 61/228,080, filed on Jul. 23, 2009, provisional application No. 61/227,356, filed on Jul. 21, 2009.

(51) Int. Cl.
*H04L 1/00* (2006.01)
*H04B 7/0413* (2017.01)
*H04W 72/12* (2009.01)

(56) References Cited

U.S. PATENT DOCUMENTS

| | | | |
|---|---|---|---|
| 6,175,743 | B1 | 1/2001 | Alperovich et al. |
| 6,377,813 | B1 | 4/2002 | Kansakoski et al. |
| 7,599,332 | B2 | 10/2009 | Zelst et al. |
| 7,742,390 | B2 | 6/2010 | Mujtaba |
| 8,155,138 | B2 | 4/2012 | van Nee |
| 8,289,869 | B2 | 10/2012 | Sawai |
| 8,437,440 | B1 | 5/2013 | Zhang et al. |
| 8,526,351 | B2 | 9/2013 | Fischer et al. |
| 8,571,010 | B1 | 10/2013 | Zhang et al. |
| 8,619,907 | B2 | 12/2013 | Mujtaba et al. |
| 8,724,546 | B2 | 5/2014 | Zhang et al. |
| 8,724,720 | B2 | 5/2014 | Srinivasa et al. |
| 9,237,538 | B1 | 1/2016 | Zhang et al. |
| 2002/0098860 | A1 | 7/2002 | Pecen et al. |
| 2002/0145985 | A1 | 10/2002 | Love et al. |
| 2004/0057530 | A1 | 3/2004 | Tarokh et al. |
| 2004/0066766 | A1 | 4/2004 | Shiu et al. |
| 2005/0044473 | A1 | 2/2005 | Huang et al. |
| 2005/0058151 | A1 | 3/2005 | Yeh |
| 2005/0276347 | A1 | 12/2005 | Mujtaba et al. |
| 2006/0014554 | A1 | 1/2006 | Gerlach |
| 2006/0023669 | A1 | 2/2006 | Yamaura et al. |
| 2007/0171808 | A1 | 7/2007 | Wu et al. |
| 2007/0223469 | A1 | 9/2007 | Chandra et al. |
| 2007/0263564 | A1 | 11/2007 | Hansen et al. |
| 2008/0084837 | A1 | 4/2008 | Watanabe et al. |
| 2008/0095110 | A1 | 4/2008 | Montojo et al. |
| 2008/0310363 | A1 | 12/2008 | McBeath et al. |
| 2008/0316961 | A1 | 12/2008 | Bertrand et al. |
| 2009/0022093 | A1 | 1/2009 | Nabar et al. |
| 2009/0022128 | A1 | 1/2009 | Nabar et al. |
| 2009/0041144 | A1 | 2/2009 | Biswas et al. |
| 2009/0129298 | A1 | 5/2009 | Luo et al. |
| 2009/0196163 | A1 | 8/2009 | Du |
| 2009/0207765 | A1 | 8/2009 | Yamaura |
| 2009/0262696 | A1 | 10/2009 | Wei et al. |
| 2010/0046656 | A1 | 2/2010 | van Nee et al. |
| 2010/0061333 | A1 | 3/2010 | Marsh et al. |
| 2010/0246498 | A1 | 9/2010 | Lim et al. |
| 2010/0260114 | A1* | 10/2010 | Vermani ............... H04L 1/1854 370/329 |
| 2010/0260159 | A1 | 10/2010 | Zhang et al. |
| 2010/0284393 | A1 | 11/2010 | Abraham et al. |
| 2010/0309868 | A1 | 12/2010 | Yang et al. |
| 2011/0002219 | A1 | 1/2011 | Kim et al. |
| 2011/0096796 | A1 | 4/2011 | Zhang et al. |
| 2011/0116485 | A1 | 5/2011 | Olszewski et al. |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-83 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band,"*The Institute of Electrical and Electronics Engineers, Inc.*, pp. 1-69 (Apr. 2003).

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," The Institute of Electrical and Electronics Engineers, Inc., pp. 1-1970 (Jun. 2008).

IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE 802.20-PD-06; IEEE p. 802.20™ V14, Draft 802.20 Permanent Document; <System Requirements for IEEE 802.20 Mobile Broadband Wireless Access Systems—Version 14>, 24 pages (Jul. 16, 2004).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," Prentice Hall, pp. 1-26 (Jul. 2003).

Gunnam et al., "Multi-Rate Layered Decoder Architecture for Block LDPC Codes of the IEEE 802.11n Wireless Standard," pp. 1645-1648 (2007).

Hiertz et al., "The IEEE 802.11 Universe," *IEEE Communications Magazine*, pp. 62-70, (Jan. 2010).

(56) References Cited

OTHER PUBLICATIONS

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

van Nee, et al. "The 802.11n MIMO-OFDM Standard for Wireless LAN and Beyond," Wireless Personal Communications, vol. 37, pp. 445-453 (Jun. 2006).

U.S. Appl. No. 12/730,651, Zhang et al., "OFDMA with Block Tone Assignment for WLAN," filed Mar. 24, 2010.

\* cited by examiner

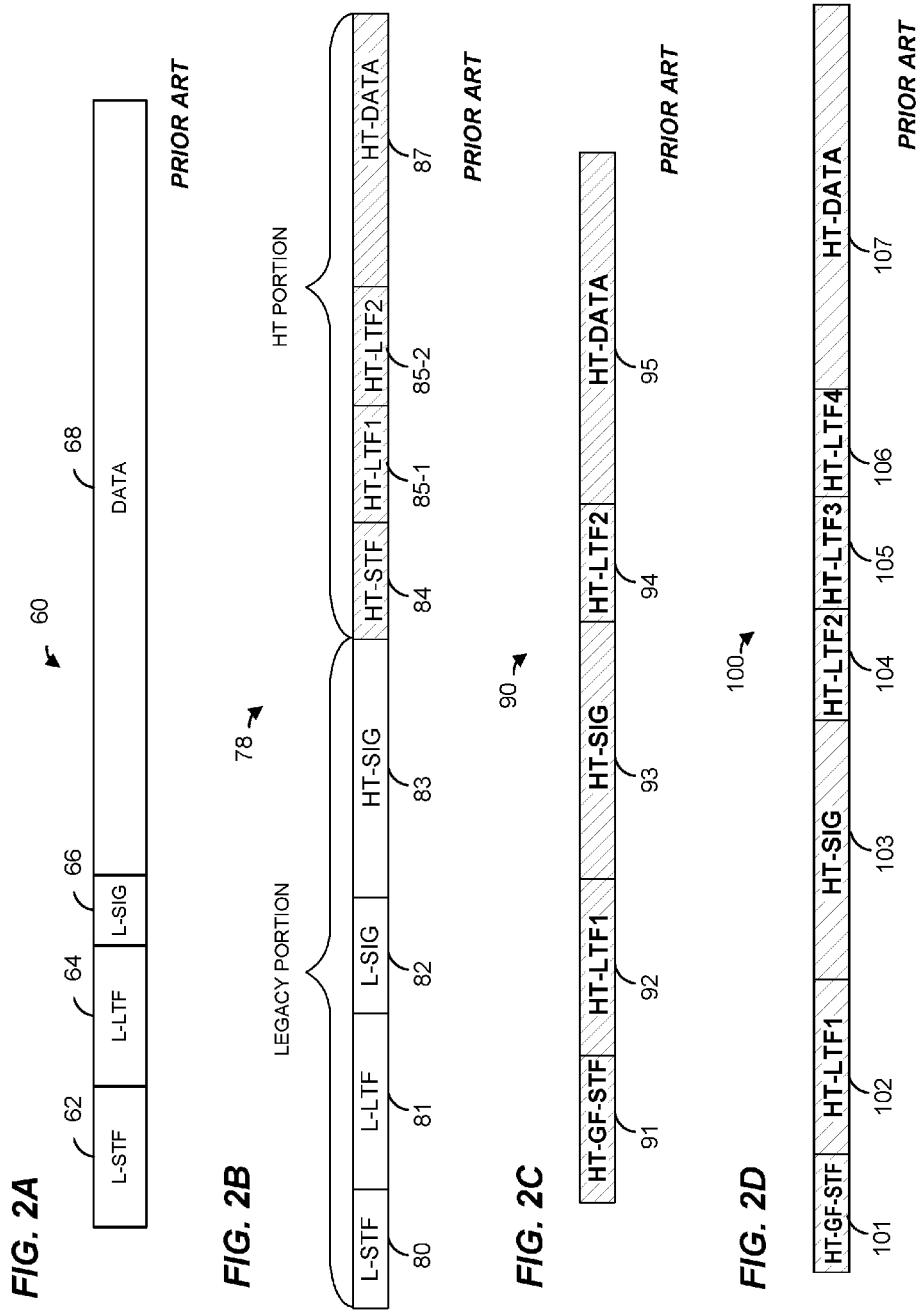

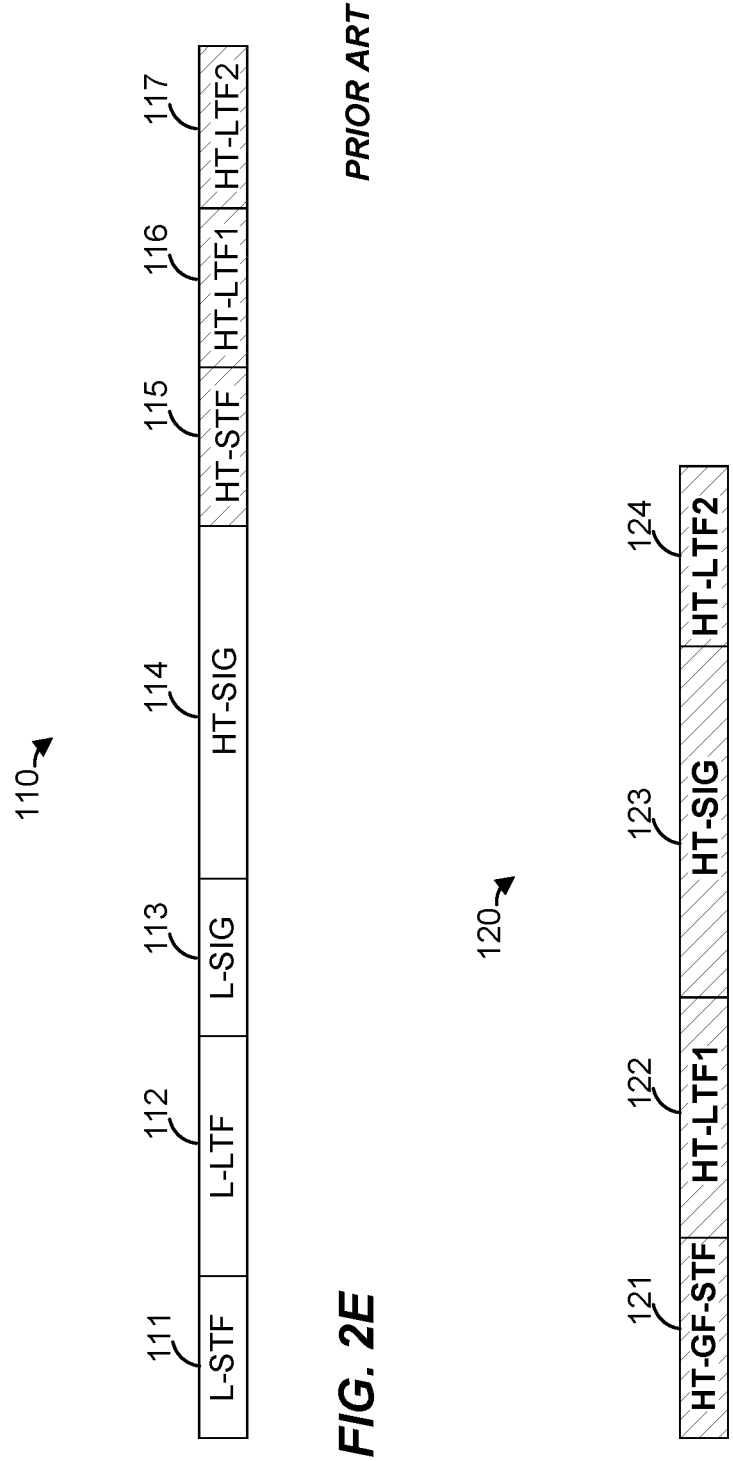

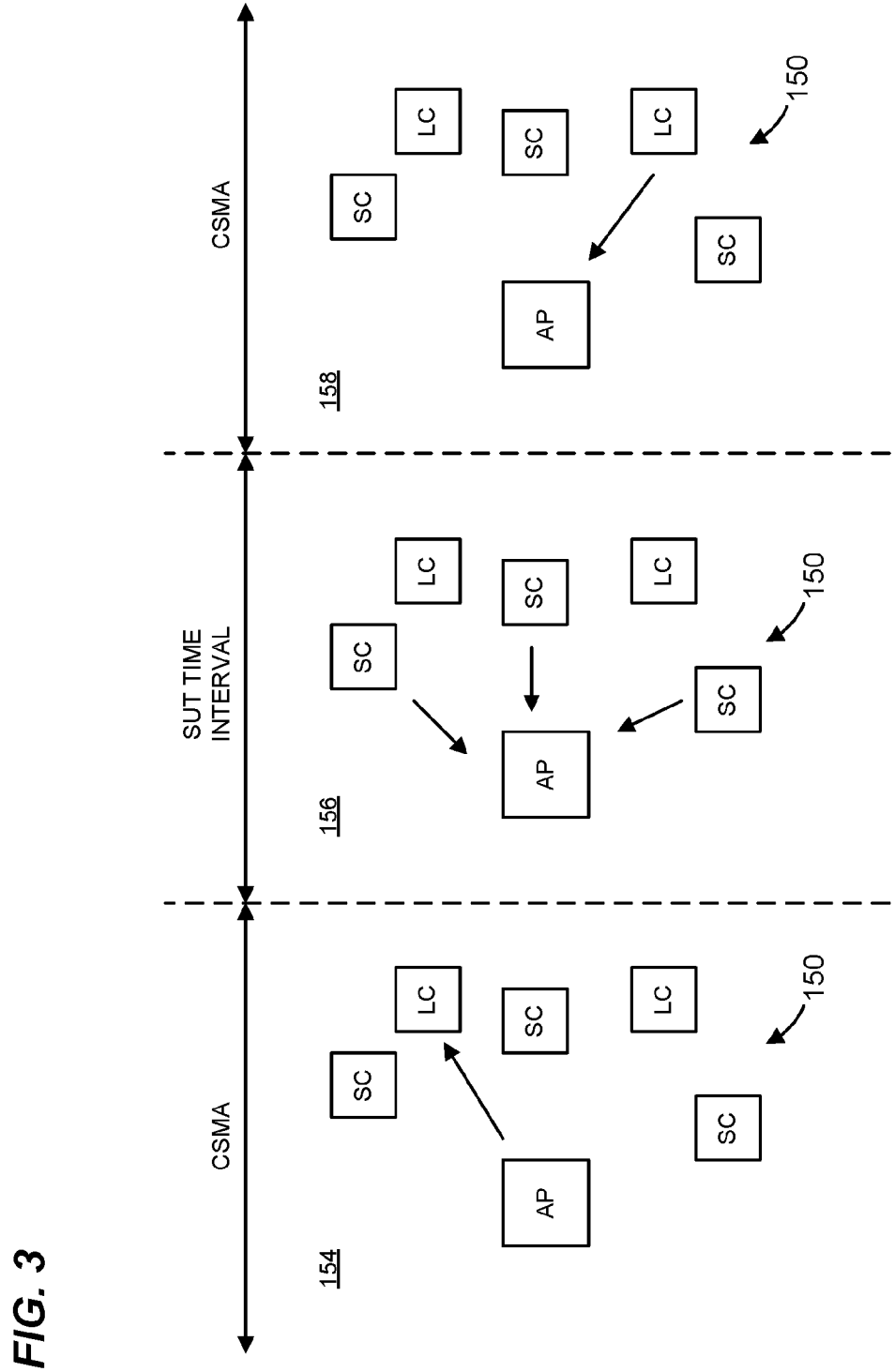

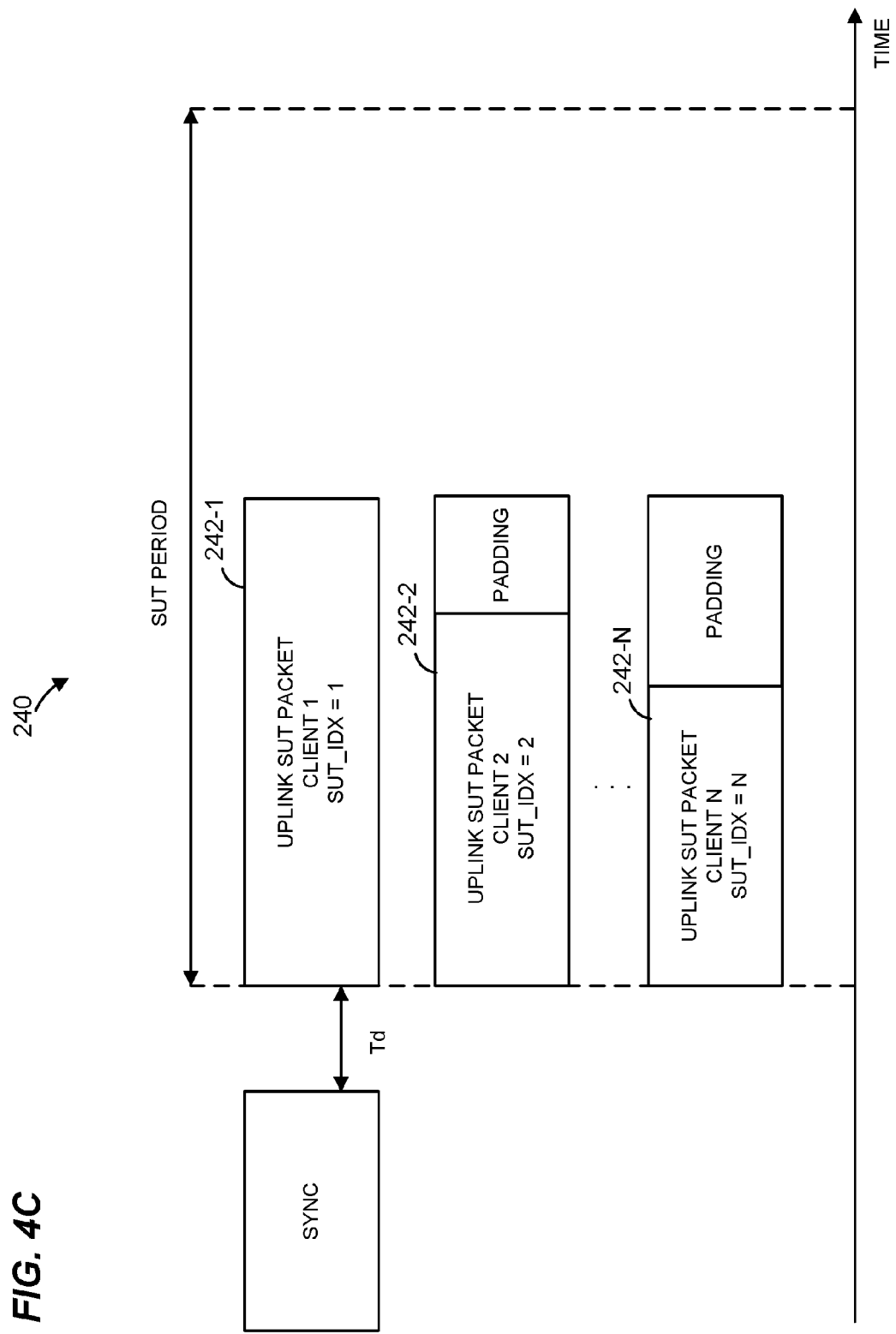

SIMULTANEOUS UPLINK TRANSMISSION IN A WIRELESS NETWORK

CROSS-REFERENCE TO RELATED APPLICATION

The present application is a divisional of U.S. patent application Ser. No. 14/065,175, now U.S. Pat. No. 9,237,538, entitled "Simultaneous Uplink Transmission in a Wireless Network", filed on Oct. 28, 2013, which is a continuation of U.S. patent application Ser. No. 12/840,260, filed Jul. 20, 2010, entitled "Simultaneous Uplink Transmission in a Wireless Network," now U.S. Pat. No. 8,571,010, which claims the benefit of the following U.S. Provisional Patent Applications:

U.S. Provisional Patent Application No. 61/227,356, entitled "Uplink Multiuser MIMO in WLAN," filed on Jul. 21, 2009;

U.S. Provisional Patent Application No. 61/228,080, entitled "Uplink Multiuser MIMO in WLAN," filed on Jul. 23, 2009;

U.S. Provisional Patent Application No. 61/230,619, entitled "Uplink Multiuser MIMO in WLAN," filed on Jul. 31, 2009; and U.S. Provisional Patent Application No. 61/254,256, entitled "Uplink Multiuser MIMO in WLAN," filed on Oct. 23, 2009.

All of the applications referenced above are hereby incorporated by reference herein in their entireties.

FIELD OF THE DISCLOSURE

The present disclosure relates generally to communication networks and, more particularly, to multiple-input, multiple-output (MIMO) wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps.

WLANs typically operate in either a unicast mode or a multicast mode. In the unicast mode, an access point (AP) transmits information to one client station at a time. In the multicast mode, the same information is transmitted to a group of client stations concurrently. In the uplink direction, a client station typically contends for access to the medium or transmits data to the AP within a time period specifically allocated to the client station.

SUMMARY

In an embodiment, a method is for use in a communication system including (i) an access point having a plurality of antennas, and (ii) a plurality of communication devices, wherein a multiple-input, multiple output (MIMO) communication channel corresponds to the plurality of antennas of the access point and respective antennas of the plurality of communication devices. The method includes: generating, at the access point, a synchronization data unit to be transmitted by the access point to the plurality of communication devices, wherein the synchronization data unit (i) is for scheduling subsequent simultaneous transmission of a plurality of data units by communication devices among the plurality of communication devices, and (ii) specifies respective sets of spatial streams that respective communication devices among the plurality of communication devices are to use when transmitting respective data units among the plurality of data units; receiving, at the access point, a signal via the plurality of antennas, wherein the signal corresponds to the plurality of data units transmitted simultaneously from the respective communication devices among the plurality of communication devices via the respective sets of sets of spatial streams; generating an estimate of the MIMO communication channel using a plurality of training fields included in a first portion of the signal; and decoding data in a second portion of the signal using the estimate of the MIMO communication channel, wherein the data in the second portion of the signal corresponds to data included in the plurality of data units.

In another embodiment, an apparatus is for use in a communication system including (i) an access point having a plurality of antennas, and (ii) a plurality of communication devices, wherein a multiple-input, multiple output (MIMO) communication channel corresponds to the plurality of antennas of the access point and respective antennas of the plurality of communication devices. The apparatus comprises a network interface device having one or more integrated circuits configured to: generate a synchronization data unit to be transmitted by the access point to the plurality of communication devices, wherein the synchronization data unit (i) is for scheduling subsequent simultaneous transmission of a plurality of data units by communication devices among the plurality of communication devices, and (ii) specifies respective sets of spatial streams that respective communication devices among the plurality of communication devices are to use when transmitting respective data units among the plurality of data units, generate an estimate of the MIMO communication channel using a plurality of training fields included in a first portion of a signal, the signal received via the plurality of antennas, wherein the signal corresponds to the plurality of data units transmitted simultaneously from the respective communication devices among the plurality of communication devices via the respective sets of sets of spatial streams, and decode data in a second portion of the signal using the estimate of the MIMO communication channel, wherein the data in the second portion of the signal corresponds to data included in the plurality of data units.

BRIEF DESCRIPTION OF THE DRAWINGS

FIG. 2A is a diagram of a prior art data unit format used in a communication system in which all devices support only a single spatial stream;

FIG. 2B is a diagram of a prior art data unit format used in a communication system in which some devices support only a single spatial stream, and other devices support two spatial streams;

FIG. 2C is a diagram of a prior art data unit format used in a communication system in which all devices support two spatial streams;

FIG. 2D is a diagram of a prior art data unit format used in a communication system in which all devices support four spatial streams;

FIG. 2E is a diagram of a prior art sounding data unit format used in a communication system in which some devices support only one spatial stream, and some devices support two spatial streams;

FIG. 2F is a diagram of a prior art sounding data unit format used in a communication system in which all devices support two spatial streams;

FIG. 3 is a diagram illustrating communications in a communication network during carrier sense multiple access (CSMA) time periods and a simultaneous uplink transmission (SUT) time period, according to an embodiment;

FIG. 4C is a timing diagram illustrating simultaneous uplink transmission of communication frames having non-equal length and an appropriate padding field, according to an embodiment;

DETAILED DESCRIPTION

In embodiments described below, several network devices simultaneously transmit independent data to another network device during a certain time period. In an embodiment, the receiving device is an access point (AP) of a wireless communication network that receives simultaneous uplink transmission (SUT) signals such as communication frames (or simply "frames") from several client stations (or simply "stations") via an antenna array. To this end, in accordance with an embodiment, the AP schedules a "protected" time period for use by SUT-capable stations only, provides synchronization data to SUT-capable clients, receives in parallel several communication frames of the same or different duration, and acknowledges the receipt of the communication frames in a single acknowledgement frame or several station-specific acknowledgement frames. As discussed below, the AP in some embodiments also controls one or more of (i) the power at which stations transmit SUT frames during the protected time period, (ii) the maximum duration of an SUT frame, (iii) the amount of bandwidth allocated to each station, etc., and/or one or more of (iv) assigns unique indexes to stations, (v) generates modulation and coding scheme (MCS) parameters for each station, (vi) allocates spatial (or "space-time") streams to stations, etc. As also discussed below, stations format the physical layer (PHY) preambles of SUT frames so as to enable the AP and/or the stations to properly estimate the MIMO channel between the receive (Rx) antenna array of the AP and a virtual transmit (Tx) antenna array formed by the antennas of the stations, in accordance to an embodiment. The estimate of the MIMO channel is used by the AP to decode data simultaneously transmitted by the stations.

Using the techniques for scheduling an SUT period and/or formatting a PHY preamble, network devices ensure that uplink data transmitted simultaneously is properly synchronized, that power in uplink transmissions is properly controlled (e.g., so that an excessively strong signal from one station does not "drown out" signals from other stations), that SUT frames are properly acknowledged, etc. An example communication network in which some or all of these techniques can be implemented is described next, followed by a discussion of several prior art formats of a PHY preamble and a corresponding mathematical model, then followed by a discussion of several example embodiments of an access protocol according to which an AP and/or client stations schedule an SUT time period according to an embodiment, and further followed by a discussion of several example formats of a PHY preamble that the AP and the client stations can utilize.

Figure 1:
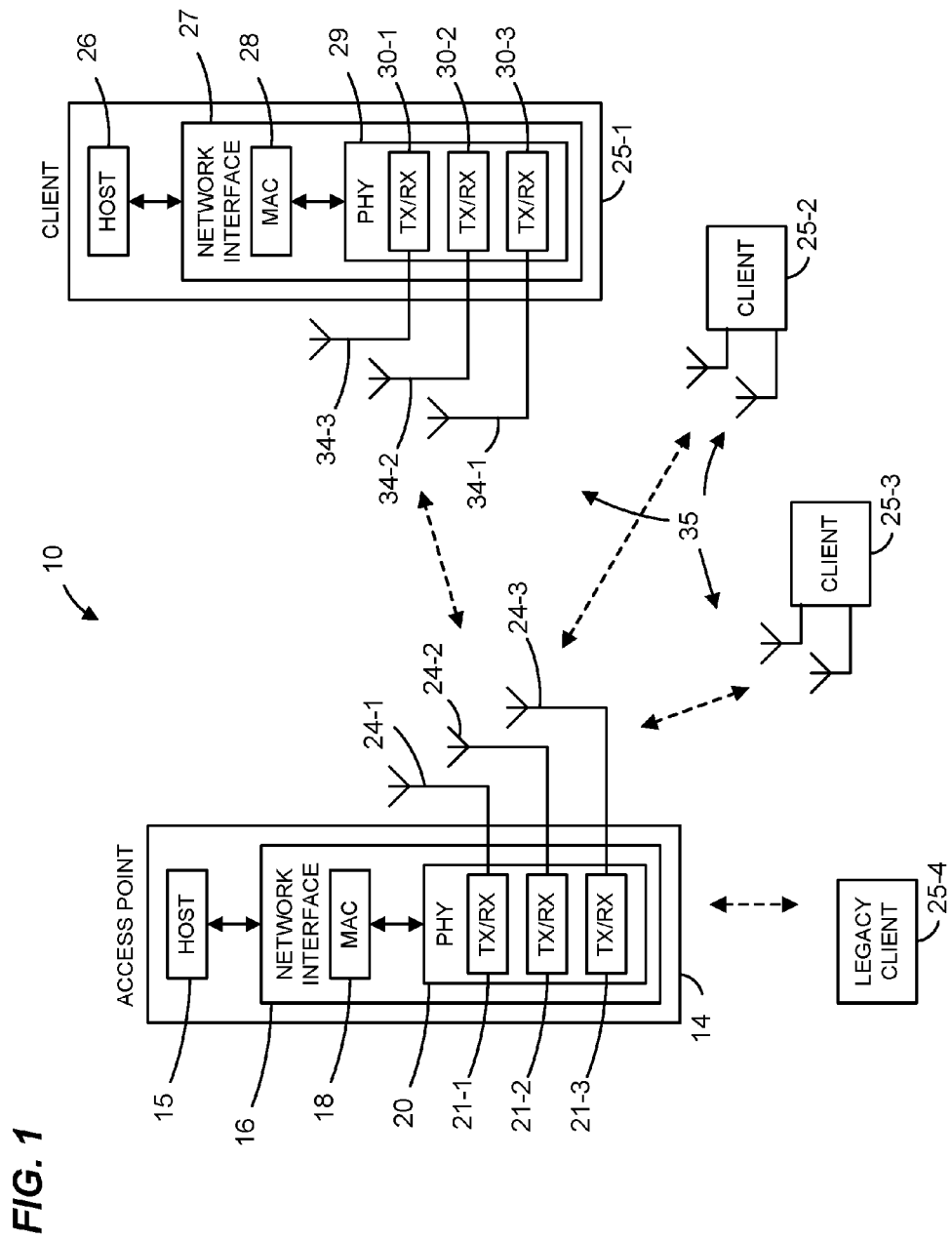
FIG. 1 a block diagram of an example wireless local area network (WLAN) that utilizes access control techniques and/or physical layer (PHY) preamble formatting techniques in accordance with an embodiment of the present disclosure.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 2, 3, 5, 6, etc.) of client stations 25 in various scenarios and embodiments. Two or more of the client stations 25 are configured to transmit corresponding data streams to the AP 14 so that the AP 14 receives the data streams simultaneously.

A client station 25-1 includes a host processor 26 coupled to a network interface 27. The network interface 27 includes a MAC unit 28 and a PHY unit 29. The PHY unit 29 includes a plurality of transceivers 30, and the transceivers are coupled to a plurality of antennas 34. Although three transceivers 30 and three antennas 34 are illustrated in FIG. 1, the client station 25-1 can include different number (e.g., 1, 2, 4, 5, etc.) of transceivers 30 and antennas 34 in other embodiments.

The client stations 25-2 and 25-3 have a structure that is the same as or generally similar to the client station 25-1. In an embodiment, each of the client stations 25-2 and 25-3 is structured like the client station 25-1 but has only two transceivers and two antennas. Together, the three antennas 34 of the client station 25-1, the two antennas of the client station 25-2 and the two antennas of the client station 25-3 form a virtual antenna array 35. In an embodiment, the AP 14 communicates data over a MIMO channel defined, at the one end, by the array including the antennas 24-1, 24-2, and 24-3 and, at the other end, by the virtual antenna array 35. The client stations 25-1, 25-2, and 25-3, as well as similar stations capable of transmitting independent uplink data to the AP 14 or a similar network device, are referred to herein as "SUT-enabled stations" or "SUT-capable stations."

In an embodiment, each of the client stations 25-1, 25-2, and 25-3 is configured to transmit multiple spatial streams via multiple transmit antennas. When space-time coding is employed, the multiple spatial streams are sometimes referred to by those of ordinary skill in the art as space-time streams. If the number of space-time streams is less than the number of transmit chains, spatial mapping and/or beamforming is employed, in some embodiments.

According to an embodiment, the legacy client station 25-4 is a legacy client station that is not enabled to transmit a data stream to the AP 24 at the same time that other client stations 25 transmit data to the AP 14. Further, in accordance with an embodiment, the legacy client station 25-4 includes a PHY unit that is generally capable of transmitting a data stream to the AP 14 at the same time that other client stations 25 transmit data to the AP 14, but the MAC unit of the legacy client station 25-4 is not enabled with MAC layer functions that support transmitting a data stream to the AP 14 at the same time that other client stations 25 transmit data to the AP 14. The structure of the client station 25-4 is generally similar to the structure of the client station 25-1, according to an embodiment.

In an embodiment, the legacy client station 25-4 operates according to the IEEE 802.11a and/or the IEEE 802.11n Standards. During operation, the SUT-capable stations and the legacy client station 25-4 utilize the communication channel as described in the in U.S. patent application Ser. No. 12/758,603, filed on Apr. 12, 2010 and entitled "Physical Layer Frame Format for WLAN," ("the '603 application"), the entire disclosure of which is expressly incorporated by reference herein. For example, in accordance with the techniques described in the above-referenced application, the legacy client station 25-4 occupies an entire communication channel in accordance with the IEEE 802.11a Standard when communicating with the AP 14, so that the AP 14 transmits data to the legacy client station 25-4 in 64 orthogonal frequency division multiplexing (OFDM) subchannels, and the legacy client station 25-4 transmits data to the AP 14 in the 64 OFDM subchannels. As another example, when the AP 14 and the legacy client station 25-4 communicate according to the IEEE 802.11n Standard using a 40 MHz channel, the AP 14 transmits data to the legacy client station 25-4 in 128 OFDM subchannels that occupy the entire channel, and the legacy client station 25-4 transmits data to the AP 14 in the 128 OFDM subchannels.

On the other hand, the AP 14 is configured, in accordance with an embodiment, to partition the wider communication channel into narrower sub-bands or OFDM sub-channel blocks, and different data streams for different client devices 25 are transmitted in respective OFDM sub-channel blocks, in accordance with the techniques described in the '603 application. According to an embodiment, each OFDM sub-channel block substantially conforms to the PHY specification of the IEEE 802.11a Standard. According to another embodiment, each OFDM sub-channel block substantially conforms to the PHY specification of the IEEE 802.11n Standard. According to another embodiment, each OFDM sub-channel block substantially conforms to a PHY specification of a communication protocol other than the IEEE 802.11a and the IEEE 802.11n Standards. In some embodiments of the WLAN 10, the AP 14 and the SUT-capable stations 25-1, 25-2, and 25-3 format PHY communication frames in the uplink and/or downlink direction using the techniques described in the '603 application.

FIG. 2A is a diagram of a prior art data unit 60 that the legacy client station 25-4 is configured to transmit to the AP 14 via OFDM modulation. The data unit 60 conforms to the IEEE 802.11a Standard and occupies a 20 Megahertz (MHz) band. The data unit 60 includes a preamble having a legacy short training field (L-STF) 62, a legacy long training field (L-LTF) 64, and a legacy signal field (L-SIG) 66. The data unit 60 also includes a data portion 68. The L-STF 62 generally includes information that is useful for packet detection and synchronization, whereas the L-LTF 64 generally includes information that is useful for channel estimation and fine synchronization. The L-SIG 66 generally signals PHY parameters to the receiving device.

FIG. 2B is a diagram of a prior art OFDM data unit 78 that the legacy client station 25-4 is configured to transmit to the AP 14 using two space-time streams for a data portion. The data unit 78 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 78 includes a legacy preamble portion having an L-STF 80, an L-LTF 81, an L-SIG 82, and a high throughput signal field (HT-SIG) 83. The data unit 78 also includes a high-throughput portion (shaded for clarity of illustration) having a high throughput short training field (HT-STF) 84, two data high throughput long training fields (HT-LTFs) 85-1 and 85-2, and a data portion 87.

FIG. 2C is a diagram of a prior art OFDM data unit 90 that the legacy client station 25-4 is configured to transmit to the AP 14 using two space-time streams for a data portion in one scenario in which the client station 25-4 is capable of transmitting at least two space-time streams. The data unit 90 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 90 includes a preamble having a high throughput Greenfield short training field (HT-GF-STF) 91, a first high throughput long training field (HT-LTF1) 92, a HT-SIG 93, a second high throughput long training field (HT-LTF2) 94, and a data portion 95.

FIG. 2D is a diagram of a prior art OFDM data unit 100 that the legacy client station 25-4 is configured to transmit to the AP 14 using four space-time streams for a data portion in one scenario in which the client station 25-4 is capable of transmitting at least four space-time streams. The data unit 100 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 100 includes a preamble having a high throughput Greenfield short training field (HT-GF-STF) 101, a first high throughput long training field (HT-LTF1) 102, a HT-SIG 103, and a block of three HT-LTF fields 104-106, and a data portion 107.

FIG. 2E is a diagram of a prior art OFDM sounding data unit 110 that the legacy client station 25-4 is configured to transmit to the AP 14 to sound two space-time streams in one scenario in which the client station 25-4 is capable of transmitting at least two space-time streams. The data unit 110 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 110 includes a legacy preamble portion having an L-STF 111, an L-LTF 112, an L-SIG 113, and a high throughput signal field (HT-SIG) 114. The data unit 110 also includes a high-throughput portion having a high throughput short training field (HT-STF) 115, two data high throughput long training fields (HT-LTFs) 116 and 117. The data unit 110 does not include a data portion.

FIG. 2F is a diagram of a prior art OFDM data unit 120 that the legacy client station 25-4 is configured to transmit to the AP 14 to sound two space-time streams in one scenario in which the client station 25-4 is capable of transmitting at least two space-time streams. The data unit 120 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 120 includes a preamble having a high throughput Greenfield short training field (HT-GF-STF) 121, a first high throughput long training field (HT-LTF1) 122, a HT-SIG 123, a second high throughput long training field (HT-LTF2) 124. The data unit 120 does not include a data portion.

It is noted that in some prior art networks, network devices use the formats discussed with reference to FIGS. 2A-F to transmit uplink data from a single transmitter to a receiver, and that space-time streams in these devices are defined between Tx antennas and Rx antennas of a pair of devices. Further, these prior networks support at most four space-time streams to convey data in a data portion of the data unit, or to sound space-time streams for estimating the corresponding MIMO channel. Receiving devices use at most one block of LTF fields included in the data units 60, 89, 90, 100, 110, or 120 for data demodulation (e.g., the fields 104-106 of the data unit 100 illustrated in FIG. 2D).

Prior to describing an access protocol and PHY frame formats that SUT-capable stations use to simultaneously transmit uplink data, a mathematical model that generally describes estimation of a MIMO channel using a PHY preamble is briefly considered. A high throughput long training field (HT-LTF) is defined as a finite sequence of values (e.g., "1, 1, −1, −1, 1, . . . 1, 1"). To train or estimate a MIMO channel having $N_{STS}$ space-time streams, $N_{STS}$ or more HT-LTFs are transmitted to the receiver. For example, to enable data demodulation when a transmitter uses four space-streams to transmit a data payload (e.g., the data portion of a data unit) to a receiver, the transmitter in an embodiment generates four HT-LTFs and transmits the four HT-LTFs using four different spatial mapping configurations. In some embodiments, a MIMO channel between a transmitter and a receiver includes more than four space-time streams. In these cases, the transmitter and the receiver can utilize the techniques and frame formats described in the in U.S. patent application Ser. No. 12/790,158, filed on May 28, 2010 and entitled "PHY Frame Formats in a System with more than Four Space-Time Streams," ("the '158 application"), the entire disclosure of which is expressly incorporated by reference herein.

For each sub-carrier used in the OFDM mode, an instance of the HT-LTF sequence is mapped to a set of space-time streams using a matrix $P_{HTLTF}$. In an embodiment, the matrix $P_{HTLTF}$ is defined as the following Hadamard matrix:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

In this embodiment, each element of $P_{HTLTF}$ is +1 or −1. In another embodiment, however, each element of $P_{HTLTF}$ is a complex number (e.g., a Discrete Fourier Transform matrix is used as $P_{HTLTF}$). In another embodiment, some elements of $P_{HTLTF}$ are integers other than +1 or −1.

As each HT-LTF is generated, a separate column of the matrix $P_{HTLTF}$ is used to map the values to space-time streams. For example, the first column of the matrix $P_{HTLTF}$ is applied to each value in the sequence defining the first instance of HT-LTF in a certain PHY preamble, the second column of the matrix $P_{HTLTF}$ is applied to each value in the sequence defining the second instance of HT-LTF of the PHY preamble, etc. In an embodiment, each instance of HT-LTF is an OFDM symbol.

In at least some of the embodiments, a frequency-domain Cyclic Delay Diversity (CDD) matrix D is applied to each of the resulting space-time streams of the OFDM-MIMO channel to avoid undesirable beamforming effects, for example. Application of the CDD matrix is equivalent to introducing linear phase shifts over different sub-carriers of OFDM in at least some embodiments. Further, in accordance with an embodiment, the space-time streams are then mapped to transmit chains of the transmitting device, each of which is associated with a corresponding transmit antenna. In general, the number of transmit antennas $N_{TX}$ is greater than or equal to the number of space-time streams $N_{STS}$. To this end, a spatial mapping matrix Q is defined at a transmitter.

In accordance with some protocols, the time-domain signal transmitted via a transmit chain $i_{TX}$ and received via $N_{SR}$ sub-carriers over $N_{STS}$ space-time streams is given by:

$$r_{HT-LTF}^{n,i_{tx}}(t) = \frac{1}{\sqrt{N_{STS} N_{HT-LTF}^{Tone}}} w_{T_{HT-LTF_n}}(t) \cdot \cdot \quad \text{(Eq. 1)}$$

-continued $$\sum_{k=-N_{SR}}^{N_{SR}} \sum_{i_{STS}=1}^{N_{STS}} [Q_k]_{i_{TX}, i_{STS}} [P_{HTLTF}]_{i_{STS}, n} \gamma_k HTLTF(k) \cdot \cdot$$

$$\exp\left(j2\pi k \Delta_F \left(t - T_{GI} - T_{CS}^{i_{STS}, n}\right)\right)$$

In Eq. 1, the exponential term corresponds to the phase shift using the frequency CDD matrix D on the sub-carrier k for the space-time stream $i_{STS}$. The terms $T_{GI}$ and $T_{CS}^{i_{STS}}$ used in defining the exponential term of Eq. 1 are the same as or similar to the terms $T_{GI}$ and $T_{CS}$ defined by IEEE 802.11n Standard, the entire disclosure of which is expressly incorporated by reference herein. Similarly, in an embodiment, the function $\gamma_k$ is defined as in the IEEE 802.11n Standard or is another suitable function similar to the corresponding function defined in the IEEE 802.11n Standard.

Accordingly, for a sub-carrier k, the received signal $x^k$ corresponding to all transmitted HT-LTFs is given by:

$$x^k = H^k Q_{1:N_{TX},1:N_{STS}}^k D_{N_{STS}}^k P_{1:N_{STS},1:N_{HTLTF}} HTLTF(k), \quad (Eq. 2)$$

where $H^k$ is a MIMO $N_{RX} \times N_{TX}$ channel matrix (with $N_{RX}$ corresponding to the number of receive antennas and $N_{Tx}$ corresponding to the number of transmit antennas), $Q_{1:N_{TX},1:N_{STS}}^k$ is the first $N_{STS}$ columns of an antenna map or spatial mapping matrix that maps space-time streams to $N_{TX}$ transmit antennas, $D_{N_{STS}}^k$ is a frequency-domain CDD matrix, $P_{1:N_{STS},1:N_{HTLTF}}$ is the first $N_{STS}$ rows of the matrix P, and HTLTF(k) is a pilot symbol used in the k-th sub-carrier.

In accordance with an embodiment of the present disclosure, two or more SUT-capable stations jointly transmit several training fields, referred to hereinafter as very high throughput short training fields (VHT-STFs) and very high throughput long training fields (VHT-LTFs), to train a MIMO channel defined by the Rx antenna array of an AP and a virtual Tx antenna array of the two or more SUT-capable stations. Depending on the embodiments, the total number of VHT-(S)LTFs is two, four, five, six, etc. In a system with U STA-capable stations, $$P_{i_{STS\_(u)}, n}^{(k)}$$

specifies a training (or "pilot") sequence transmitted on the sub-carrier k for the n-th training symbol at the $i_{STS}$-th space-time stream of station u. Each of the U STA-capable stations transmits the corresponding training sequence over $N_{STS\_u}$ space-time streams. For example, station 1 transmits over two space-time streams, station 2 transmits over four space-time streams, etc. In these embodiments, a channel training matrix $P^{(k)}$ specifies how pilot sequences are distributed during MIMO OFDM training over U stations. In particular, according to this embodiment, each row of the channel training matrix $P^{(k)}$ is transmitted over a single space-time stream, and each column of the matrix $P^{(k)}$ applies to one VHT-(S)LTF symbol (i.e., one OFDM symbol). Thus, the overall set of VHT-(S)LTFs transmitted by U SUT-capable stations, prior to spatial mapping, is given by $P^{(k)}s(k)$, where s(k) is the training symbol at the k-th sub-carrier.

In an embodiment, $N_{STS\_u}$ rows of the matrix $P^{(k)}$ are allocated to each station u in the set of U SUT-capable stations. Accordingly, VHT-(S)LTFs transmitted from the station u is $P_{(u)}^{(k)}s(k)$. Thus, $$P^{(k)} = \begin{bmatrix} P_{(1)}^{(k)} \\ P_{(2)}^{(k)} \\ \vdots \\ P_{(U)}^{(k)} \end{bmatrix} \quad (Eq. 3)$$

In general, the matrix $P^{(k)}$ is any matrix known at the AP and the SUT-capable stations. In some embodiments, the matrix is $P^{(k)}$ orthogonal. In an embodiment, the matrix is $P^{(k)}$ unitary. In an embodiment, is $P^{(k)}$ given by $$P^{(k)} = \text{diag}\{a_1^{(k)} \ldots a_{N_{STS\_SUT}}^{(k)}\}[P_{VHTLTF}], \quad (Eq. 4)$$

where $P_{VHTLTF}$ is a row-orthogonal matrix and a, is any complex number. In an embodiment, $P_{VHTLTF}$ is similar or identical to the matrix $P_{HTLTF}$ discussed above. The techniques for assigning rows of the matrix $P^{(k)}$ to SUT-capable stations from several stations are further considered below, and several examples of using a channel training matrix when transmitting VHT-LTFs in parallel are discussed with reference to FIGS. 6A-C.

FIG. 3 is a diagram illustrating communications in a WLAN 150, according to an embodiment, during three time periods: a first carrier sense, multiple access (CSMA) period 154, an SUT time period 156, and a second CSMA period 158. In FIG. 3, time progresses from left to right so that the first CSMA period 154 occurs first, the SUT time period 156 occurs second, and the second CSMA period 158 occurs third. In this embodiment, the WLAN includes an AP, a plurality of legacy client stations (LCs), and a plurality of SUT-capable client stations (SC).

According to the IEEE 802.11a and the IEEE 802.11n Standards, different devices share the communication channel by utilizing a CSMA protocol. Generally speaking, CSMA, according to the IEEE 802.11a and the IEEE 802.11n Standards, specifies that a device that wishes to transmit should first check whether another device in the WLAN is already transmitting. If another device is transmitting, the device should wait for a backoff time period and then again check again to see whether the communication channel is being used. If a device detects that the communication channel is not being used, the device then transmits using the channel. With CSMA, in other words, data that is for a particular device (i.e., not multicast data) can only be transmitted on the channel when no other data is being transmitted on the channel.

In the first CSMA period 154, the AP transmits a legacy downlink signal (e.g., a communication frame, a data packet, another type of a data unit) to one of the LCs. In general, the AP and the LC can negotiate the CSMA period 154 using any suitable handshaking protocol such as request-to-send/clear-to-send (RTS/CTS). The SUT period 156 is reserved for simultaneous uplink transmissions from two or more SUT-capable stations to the AP. Thus, in the SUT period 156, several SCs transmit uplink signals with independent data streams to the AP at the same time. In the second CSMA period 158, an LC transmits a legacy uplink signal to the AP.

Embodiments of an SUT access protocol for SUT signals will now be described. In the following embodiments, the AP is equipped with an antenna array (i.e., a plurality of antennas) and a MIMO receiver. The AP and/or client stations reserve a protected SUT time period for simultaneous uplink transmissions for use by SUT-capable stations only, and accordingly exclude legacy stations from using the SUT period for uplink transmissions. To this end, an AP and/or stations can use any suitable MAC-layer scheduling/ messaging mechanisms, including scheduling/messaging mechanisms similar to those defined in the existing IEEE 802.11a/n Standards. During an SUT period, signals from several SCs are synchronized using explicit or implicit scheduling. In some embodiments, an AP generates synchronization information and transmits the synchronization information to the SCs prior to receiving SUT signals.

Figure 4A:
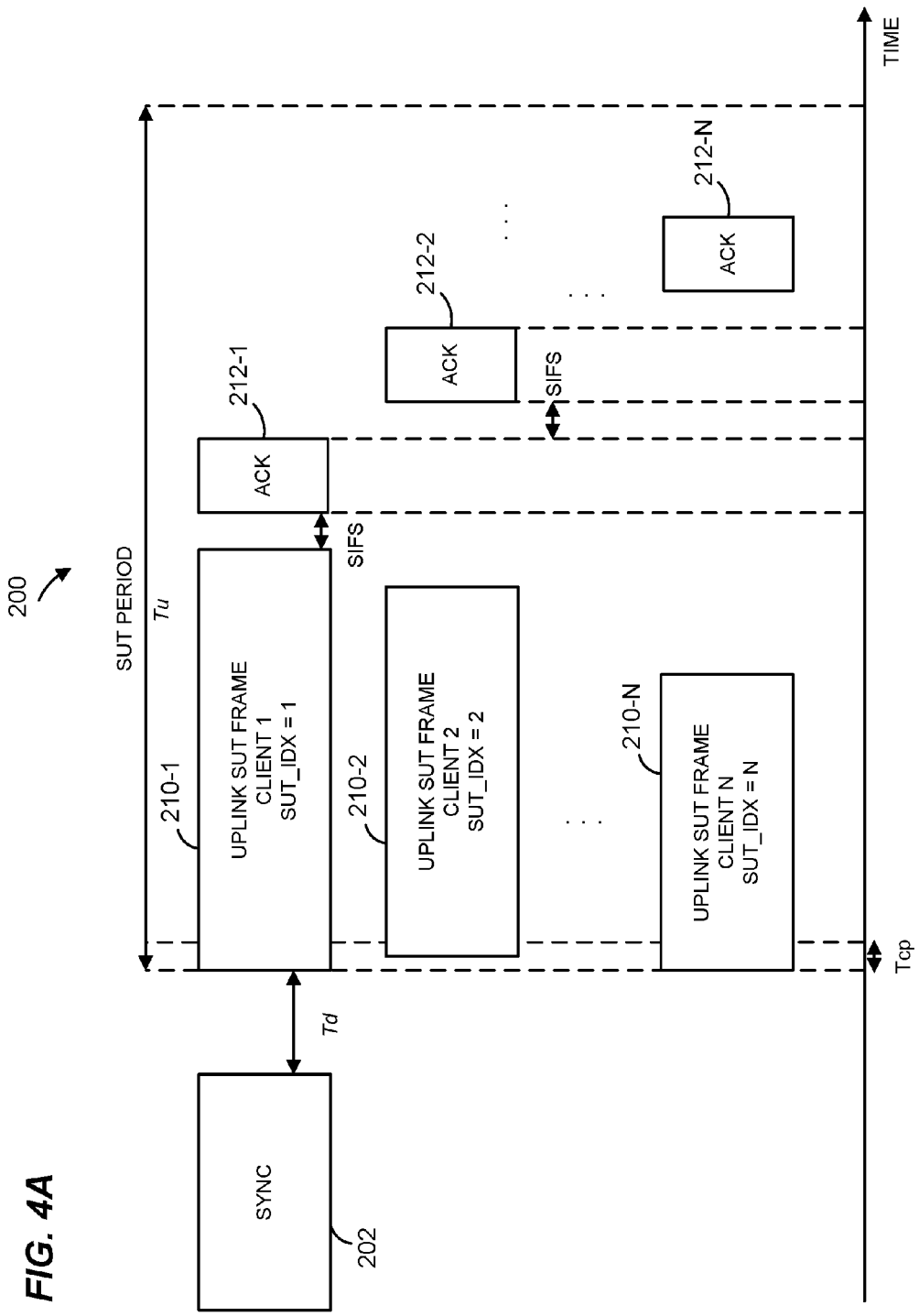
FIG. 4A is a timing diagram illustrating simultaneous uplink transmission during an SUT period followed by individual acknowledgements, according to an embodiment.

FIG. 4A is a timing diagram of an SUT period, according to an embodiment. An AP allocates a protected SUT period 200 of duration Tu. In the illustrated embodiment, the AP controls synchronization and timing of the SUT period 200 at least partly by generating a synchronization frame 202 and broadcasting (or multicasting) the synchronization frame 202 to SUT-capable stations. In another embodiment, the AP transmits a synchronization frame to each SUT-capable station individually. The SUT period 200 begins following the transmission of the synchronization frame 202 after a synchronization period of duration Td. The synchronization frame 202 specifies timing of the SUT period 200 (e.g., the start time, the duration Tu), according to an embodiment. Further, depending on the particular embodiment, the synchronization frame 202 includes one or more of the following: an indication of which of the SUT-capable stations are expected to transmit uplink data during the SUT period 200, a respective index assigned to each SUT-capable station expected to communicate during the SUT period 200, the total number of space-time streams available for uplink transmission, a listing of space-time streams allocated to each individual SUT-capable station for the SUT period 200, bandwidth of SUT frames (e.g., 20 MHz, 40 MHz, 80 MHz), a respective modulation and coding scheme for each SUT-capable station expected to transmit during the SUT period 200, a respective power control parameter for each SUT-capable station expected to transmit during the SUT period 200, the maximum duration of an SUT frame that can be transmitted during the SUT period 200, etc.

In some embodiments, the AP controls the selection of SUT-capable stations that transmit uplink data during the SUT period 200. As one example, the AP determines, based on previous communications, that four SUT-capable stations wish to transmit communication frames to the AP in the next available SUT period, but that only three of the four SUT-capable stations can be accommodated during the SUT period 200. In an embodiment, the AP selects three SUT-capable stations based on the quality of service or another suitable criterion (or several criteria). The synchronization frame 202 subsequently includes a listing of SUT-capable stations selected to communicate during the SUT period 200, according to an embodiment.

In the embodiment of FIG. 4A, N SUT-capable stations transmit communication frames or packets 210-1, 210-2, . . . 210-N, respectively. The frames 210-1, 210-2, . . . 210-N need not be of the same duration. However, as discussed in more detail below, the communication frames 210-1, 210-2, . . . 210-N, in an embodiment, transmit identical sequences in a synchronized manner during at least a portion of the PHY preamble. Further, the frames 210-1, 210-2, . . . 210-N need not arrive at the AP at precisely the same time. However, the start of each of the frames 210-1, 210-2, . . . 210-N must be received within the duration Tcp of a cyclic prefix (CP) of an OFDM symbol to ensure proper processing, according to an embodiment. Thus, even though the SUT frame 210-2 in FIG. 4 arrives later than the frames 210-1 and 210-N, the AP can properly process the SUT frame 210-2 because the start of the SUT frame 210-2 is received within the time interval of duration Tcp.

In an embodiment, each SUT-capable station includes a corresponding SUT index (SUT_IDX) assigned to the station in the synchronization frame 202. In another embodiment, the AP relies on the MAC address or another parameter to differentiate between the frames 210-1, 210-2, . . . 210-N. To acknowledge a successful receipt of N SUT frames, the AP transmits N acknowledgement frames 210-1, 210-2, . . . 210-N separated by a predefined Short Inter Frame Space (SIFS), according to an embodiment. The technique for transmitting acknowledgements illustrated in FIG. 4 may be referred to as "staggered acknowledgement." Each acknowledgment is a positive acknowledgement (ACK) or a negative acknowledgement (NACK), depending on whether the SUT frame has been received properly and/or timely.

In an embodiment, the AP schedules Tu so as to allocate both SUT packets and staggered acknowledgements. Further, according to an embodiment, the transmissions of acknowledgements are pre-scheduled. For example, the AP may schedule to transmit an ACK or a NACK for an SUT frame to be received from a station with SUT_IDX=1 at a time Ta irrespective of the actual duration of the SUT frame. The acknowledgements are transmitted in the ascending order of the SUT_IDX, in an embodiment.

Figure 4B:
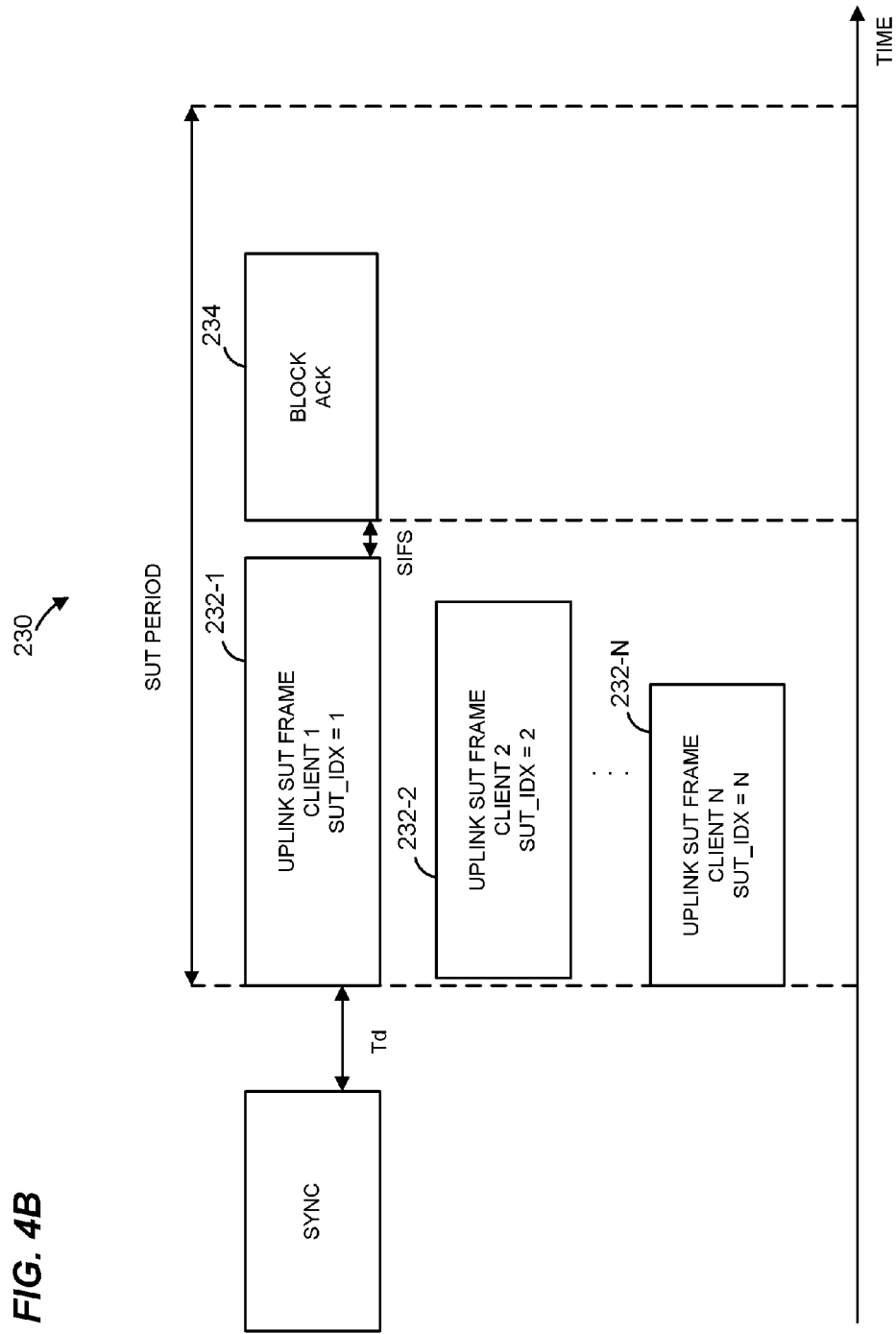
FIG. 4B is a timing diagram illustrating simultaneous uplink transmission during an SUT period followed by a block acknowledgement, according to an embodiment.

Referring to FIG. 4B, an SUT period 230 is generally similar to the SUT period 200 discussed with reference to FIG. 4A, except that upon receiving SUT frames 232-1, 232-2, . . . 232-N, an AP transmits a block acknowledgement frame 234 to SUT-capable stations that communicate during the SUT period 230. In an embodiment, the block acknowledgement frame 234 specifies the identity (e.g., SUT_IDX or the MAC address) of each SUT-capable station from which a SUT frame has been successfully received. In one such embodiment, the block acknowledgement frame 234 is transmitted after a predefined interval (e.g., SIFS) following the receipt of the longest SUT frame.

In some embodiments, an AP specifies a fixed duration of SUT frames in a synchronization frame, for example. In one such embodiment, SUT-capable stations pad the corresponding SUT frames at the PHY layer or the MAC layer. FIG. 4C illustrates one such padding technique. During an SUT period 240, SUT frames 242-1, 242-2, and 242-N are padded to conform to the same length requirement.

However, in accordance with another embodiment, the AP checks the duration of each SUT frame using a station-specific field such as HT-SIG or VHT-SIG in the PHY preamble, for example, and delays clear channel assessment (CCA) until the longest SUT frame is fully received. Shared as well as station-specific fields of a PHY preamble are discussed more fully below. In another embodiment, an AP determines certain PHY parameters, such as MCS and the length of an SUT packet, for each SUT-capable station and provides PHY parameters to the stations in a synchronization frame. In this case, stations need not specify the already-determined PHY parameters in a HT-SIG or VHT-SIG field of the preamble. In an embodiment, stations omit a VHT-SIG from the PHY preamble when PHY parameters are determined by the AP prior to stations transmitting SUT frames.

As indicated above, an AP in at least some of the embodiments controls the number of available space-time streams and allocates space-time streams to individual SUT-capable stations. In an example scenario, an AP is capable of receiving data over four concurrent space-time streams via four receive antennas (i.e., Nrx=Nss=4). The AP accepts to receive SUT frames from two SUT-capable stations A and B during an SUT period (e.g., 200, 230, 240). In an embodiment, the AP assigns two space-time streams to station A and two space-time streams to station B. For this purpose, the AP assigns the SUT_IDX=1 to station A and SUT_IDX=2 to station B, and includes an indication in the synchronization frame that station A is being assigned two space-time streams, and station B is being assigned two space-time streams, according to an embodiment. Each of the AP and stations A and B stores the same four-by-four channel estimation matrix $P^{(k)}$ for each sub-carrier k, and station A accordingly utilizes a first set of two rows of the matrix $P^{(k)}$ (e.g., the first two rows) to map data to space-time streams, while station B utilizes a second set of two rows of the matrix $P^{(k)}$ (e.g., the last two rows). Because the AP stores the assignment of space-time streams and SUT indexes to stations, the AP can properly separate signals received from stations A and station B, respectively. In an embodiment, the AP transmits to Stations A and B indications of the set of rows of the matrix $P^{(k)}$ that are to be utilized by the Stations A and B.

In an embodiment, an AP monitors signal strength, interference levels, and other physical parameters of SUT-capable stations to control transmission power at each station. In other words, because the ability of a client station to transmit SUT data to an AP is dependent both on the properties of the channel and the power at which other stations transmit SUT data within the same time period, an AP in some embodiments determines proper MCSs and power parameters for the participating SUT-capable stations upon conducting interference cancellation. In an embodiment, the AP suggests, rather than mandates, station-specific MCS values in the synchronization frame.

In another embodiment, each SUT-capable station independently determines the proper MCS using slow adaptation, for example. In particular, a station in some embodiments checks whether the rate used in a certain SUT period was too high or too low (based on the packer error rate, for example), and adjusts the MCS in the next SUT period.

Several example formats of a PHY preamble of an SUT frame are discussed next. In some embodiments, SUT-capable stations format SUT frames according to these formats to enable the AP to accurately estimate and train the MIMO channel as well as multiplex (i.e., separate) station-specific information received at the same time via the corresponding antenna array. For clarity, overall formats are discussed first with reference to FIGS. 5A-C, and several embodiments of specific portions of a PHY preamble are then discussed with reference to FIGS. 6A-C. SUT-capable stations can utilize these formats during SUT periods (e.g., the periods 200, 230, or 240).

Figure 5A:
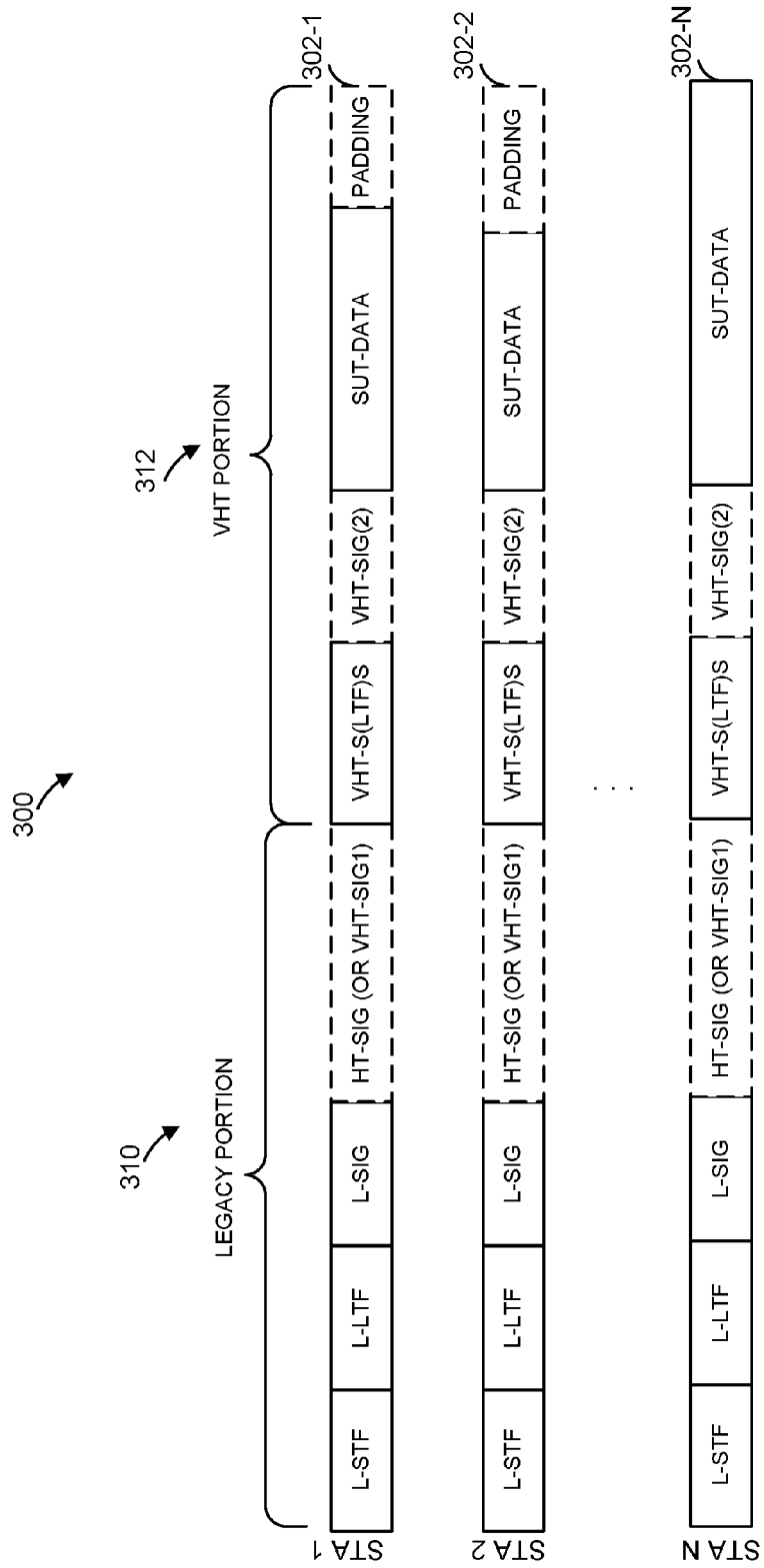
FIG. 5A is a diagram of an example format of an SUT communication frame that includes a legacy portion and a very high throughput (VHT) portion, according to an embodiment.

FIG. 5A is a diagram of communication frames 302-1, 302-2, . . . 302-N that SUT-capable stations are configured to transmit to an AP at the same time, in accordance with an embodiment. The frames 302-1, 302-2, . . . 302-N are consistent with a format 300 and are designed for mixed mode situations, i.e., when the WLAN includes a legacy station that conforms to the IEEE 802.11a Standard and/or the IEEE 802.11n Standard but not to a protocol that specifies SUT transmissions. In accordance with the format 300, a communication frame includes a legacy portion 310 and a VHT portion 312. The PHY preamble of the communication frame includes the legacy portion 310 and one or several fields of the VHT portion 312. The legacy portion 310 is the same in each of the PHY preambles 302-1, 302-2, . . . 302-N. By contrast, the VHT portion 312 of the PHY preambles 302-1, 302-2, . . . 302-N includes station-specific information, and thus need not be the same. The legacy portion 310 is transmitted in accordance with such data rate and MCS that all receivers operating in a WLAN, i.e., legacy receivers and non-legacy receivers, are capable of properly demodulating the information included in this portion. However, only some receivers (e.g., SUT-capable APs and stations) are capable of properly receiving information included in the VHT portion 312.

In an embodiment, the L-SIG field and/or the HT-SIG field in the legacy portion 310 specify the duration of the communication frame so that a legacy station can properly determine the duration of the corresponding communication frame. In this manner, the legacy station does not attempt to decode SUT-DATA or transmit during the VHT portion 312. In some embodiments, the L-SIG field or the HT-SIG field indicates the duration Tu corresponding to the length of the SUT period. In one such embodiment, the duration Tu is previously specified in the synchronization frame transmitted by the AP, as discussed above. In another embodiment, the L-SIG field or the HT-SIG field specifies the maximum duration of a communication frame consistent with the format 300.

With continued reference to FIG. 5A, depending on the embodiment, the legacy portion 310 includes zero, one, or several HT-SIG fields. In another embodiment, the information associated with HT-SIG fields is instead included as the first block of the VHT-SIG field. If an HT-SIG is included, according to some embodiments, a station uses the techniques for "spoofing" an IEEE 802.11n receiver or IEEE 802.11a/c receiver, as described in the '603 application incorporated by reference above.

Figure 5B:
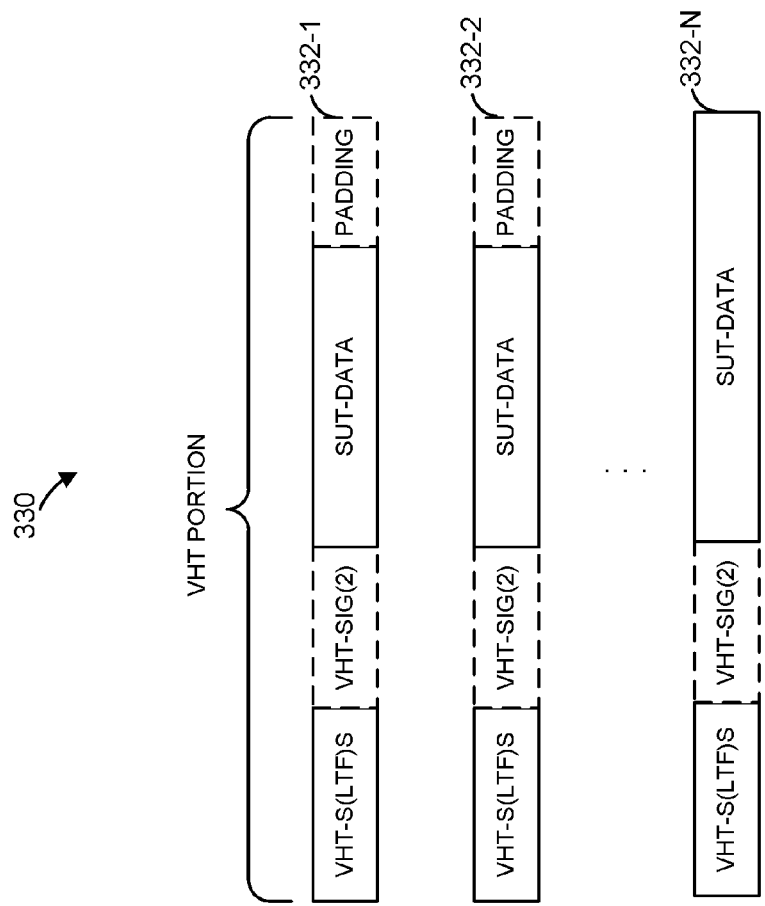
FIG. 5B is a diagram of an example format of an SUT communication frame that includes only a VHT portion, according to an embodiment.

FIG. 5B illustrates communication frames 332-1, 332-2, . . . 332-N that SUT-capable stations are configured to transmit to an AP at the same time, in accordance with another embodiment. The frames 332-1, 332-2, . . . 332-N are consistent with a format 330 and are designed for "Greenfield" situations, i.e., when the WLAN does not include any client stations that do not support SUT transmissions. In another scenario, an AP explicitly reserves an SUT time period for use by SUT-capable stations only using a synchronization frame or a suitable MAC-layer scheduling mechanism, for example, and thus does not require any information to be transmitted according to a legacy protocol during the SUT period. Accordingly, unlike the format 300, the format 330 specifies only a VHT portion.

Figure 5C:
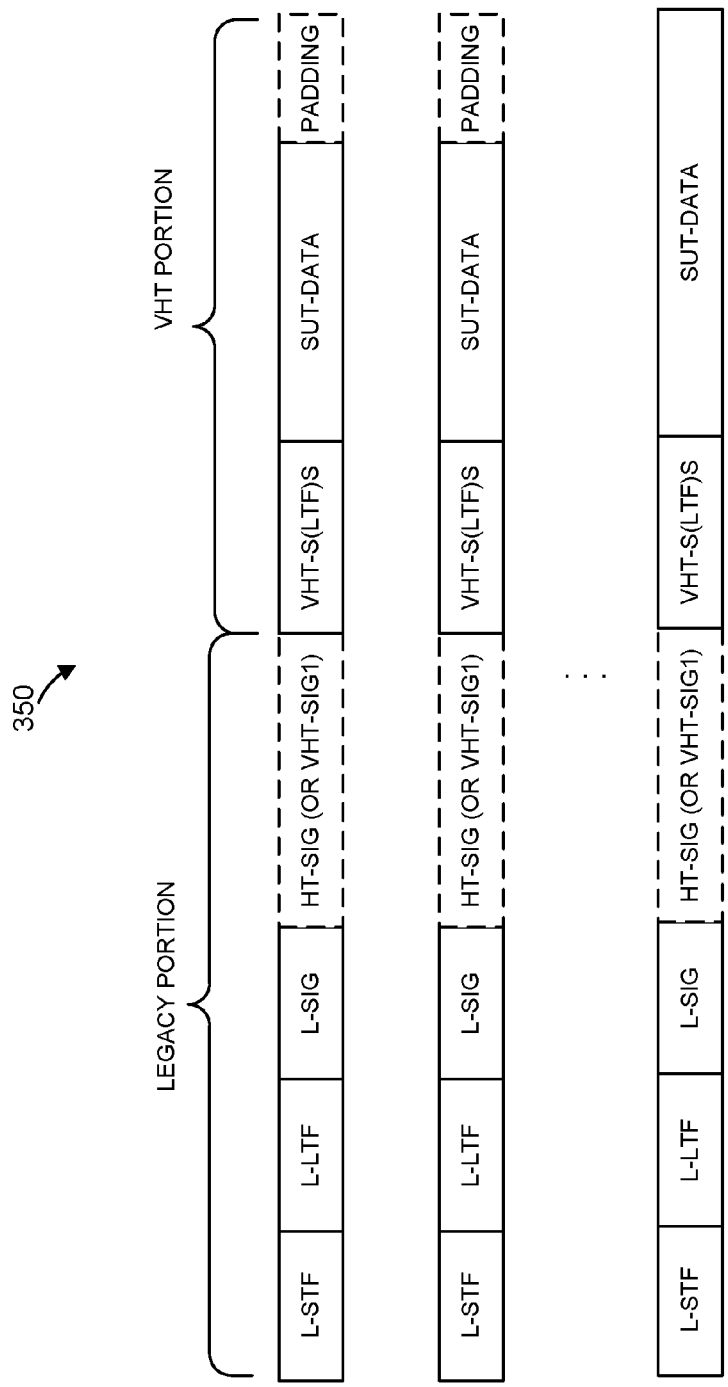
FIG. 5C is a diagram of another example format of an SUT communication frame that includes a legacy portion and a very high throughput (VHT) portion, according to an embodiment.

Referring to FIG. 5C, a frame format 350 is generally similar to the format 300, except that a VHT-SIG field in the last portion of the PHY preamble is omitted, according to another embodiment. In an embodiment, stations utilize the frame format 350 during an SUT period when an AP specifies the relevant PHY parameters in a synchronization frame, and the stations need not "echo" the same parameters back to the AP.

As indicated above, the transmit antennas of a group of SUT-capable stations can be regarded as a large virtual Tx antenna array. Accordingly, a larger number of training fields (LTFs) is needed to train a MIMO channel defined by the Rx antenna array of an AP and the virtual Tx antenna array. For example, four LTFs are needed to train a virtual Tx antenna array defined by two pairs of antennas of stations A and B, respectively.

Figure 6A:
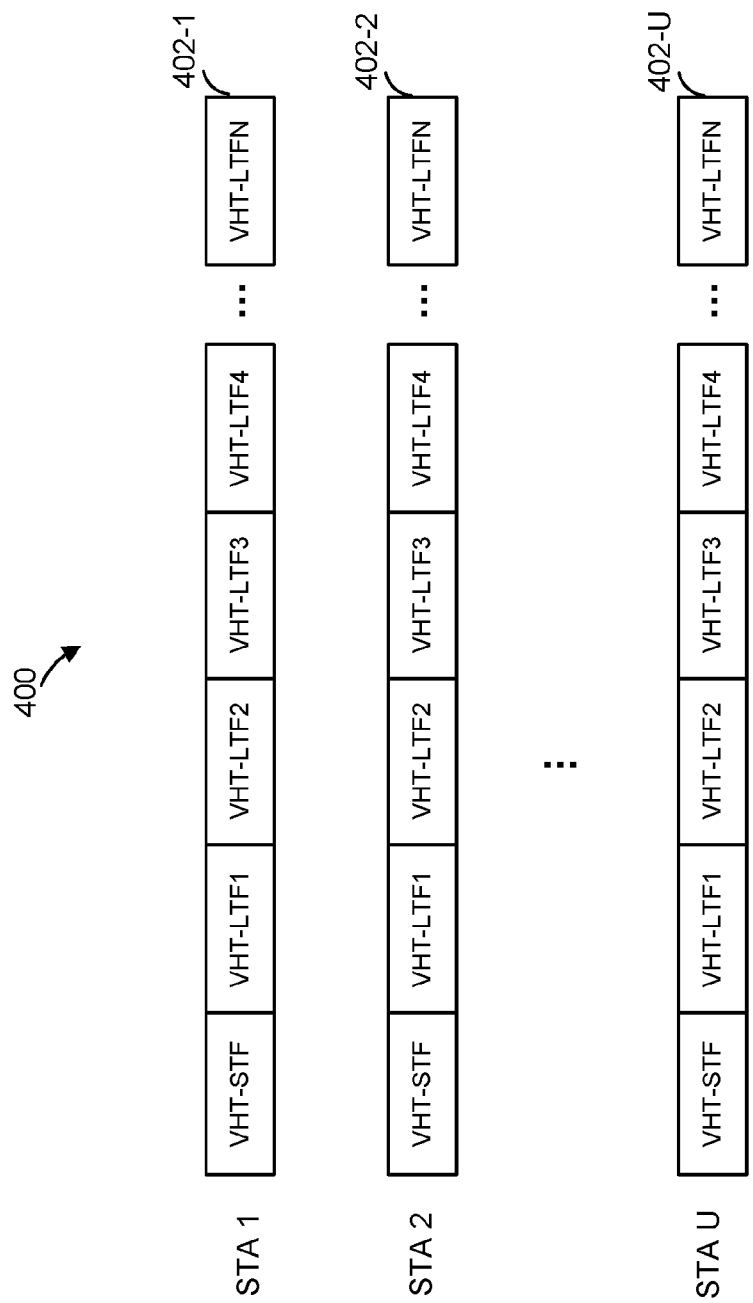
FIG. 6A is a diagram of a portion of a PHY preamble that includes several long training fields for simultaneous transmission to an access point (AP), according to an embodiment.

Referring to FIG. 6A, several SUT-capable stations transmit a sequence of VHT-LTFs conforming to a format 400 as a part of the VHT portion of a frame (e.g., the VHT portion 312 or 330), according to an embodiment. Each of the stations 1, 2, . . . U transmits the same number ($N_{STS\_SUT}$) of VHT-LTFs to jointly train a large MIMO channel. As one example, $N_{STS\_SUT}$ can be eight. In general, N STS SUT is equal to the total number of space-time streams of the MIMO channel between the U SUT-capable stations and an AP. Thus, $$N_{STS\_SUT} = \sum_k N_{STS\_k},\qquad\text{(Eq. 5)}$$

where $N_{STS\_k}$ corresponds to the number of space-time streams used by station k.

As indicated above, an AP specifies the total number of space-time streams as well as assignments of rows of the channel estimation matrix $P^{(k)}$ to SUT-capable stations, according to an embodiment. During an SUT period, a station applies the one or more rows of a shared $P^{(k)}$ matrix that have been assigned to the station in a synchronization frame (or using another assignment mechanism). For example, station 1 transmits the sequence 402-1 using rows 1 and 2 of the shared $P^{(k)}$ matrix, station 2 transmits the sequence 402-2 using rows 3 and 4 of the shared $P^{(k)}$ matrix, etc. Upon receiving, at substantially the same time, the sequences 402-1, 402-2, . . . 402-U, the AP estimates the MIMO channel using the matrix $P^{(k)}$ in view of the assignment of space-time streams and indexes (STS_IDX) to individual stations. In an embodiment, the rows of the $P^{(k)}$ matrix are allocated to each station according to the SUT_IDX, e.g., $N_{STS}^{(1)}$ rows are allocated to a station with the index SUT_IDX=1, $N_{STS}^{(2)}$ rows are allocated to a station with the index SUT_IDX=2, etc. In this manner, the AP can receive a combined SUT signal from several stations, "undo" the $P^{(k)}$ matrix (which is known to both the AP and all stations participating in the SUT period), and unambiguously determine which space time streams correspond to which stations. Subsequently, when processing the VHT-SIG and/or data portions of the communication frames, the AP can separate ("demultiplex") station-specific information (e.g., data received on space-time streams 1 and 2 is from station 1, data received on space-time streams 3-6 is from station 2, etc.). For example, the AP uses the estimate of the MIMO channel to decode the data portions simultaneously transmitted by the stations.

As will be understood, for the n-th VHT-LTF received from the station u, the signal transmitted from the $i_{TX}^{(u)}$-th antenna is given by $$r_{VHT-LTF}^{n,i_{TX}^{(u)}}(t) = \frac{1}{\sqrt{N_{STS}N_{VHT-LTF}^{Tone}}} w_{T_{VHT-LTF_n}}(t)\cdot\cdot\qquad\text{(Eq. 6)}$$

$$\sum_{k=-N_{SR}}^{N_{SR}}\sum_{i_{STS}=1}^{N_{STS}} [Q_k^{(u)}]_{i_{TX}^{(u)},i_{STS}} [P_{VHTLTF}^{(u)}]_{i_{STS},n} \gamma_k VHTLTF(k)\cdot\cdot$$

$$\exp\!\left(j2\pi k\Delta_F\!\left(t - T_{GI} - T_{CS}^{i_{STS},(u)}\right)\right)$$

in accordance with an embodiment. The matrix $P_{VHTLTF}$ in some embodiments is defined similar to the four-by-four matrix $P_{HTLTF}$ discussed above. In general, the number of rows of the $P_{VHTLTF}$ matrix is equal to $N_{STS\_SUT}$, and the number of columns of the $P_{VHTLTF}$ matrix is equal to the number of VHT-LTFs. Further, according to some embodiments, the matrix $P_{VHTLTF}$ is extended to account for more space-time streams or, conversely, is reduced to account for less than four space-time streams. For example, a larger $P_{VHTLTF}$ matrix can be defined according to the '158 reference incorporated above. A smaller $P_{VHTLTF}$ matrix can be defined as a sub-matrix of a four-by-four $P_{VHTLTF}$ matrix.

In an embodiment, upon simultaneously receiving N VHT-LTFs signals from U stations, the AP applies the following model for each sub-carrier k to estimate the channel:

$$[H^{k,(1)}Q_k^{(1)}D_k^{(1)}\;\; H^{k,(2)}Q_k^{(2)}D_k^{(2)}\;\;\ldots\;\; H^{k,(U)}Q_k^{(U)}D_k^{(U)}]\begin{bmatrix}P_{VHTLTF}^{(1)}\\ P_{VHTLTF}^{(2)}\\ \vdots\\ P_{VHTLTF}^{(U)}\end{bmatrix}.\qquad\text{(Eq. 7)}$$

$$VHTLTF(k)$$

Accordingly, the AP "undoes" (i.e., cancels out) the pre-defined sequence VHTLTF(k), inverts the matrix $P_{VHTLTF}$, and arrives at an estimate of the MIMO channel according to Eq. 8 provided below:

$$H_{EST}^{k} = [H^{k,(1)}Q_k^{(1)}D_k^{(1)}\;\; H^{k,(2)}Q_k^{(2)}D_k^{(2)}\;\ldots$$
$$H^{k,(U)}Q_k^{(U)}D_k^{(U)}]\qquad\text{(Eq. 8)}$$

In another embodiment, stations use a staggered approach to estimate the MIMO channel for SUT communications. In other words, rather than training the MIMO channel concurrently, two or more stations sequentially transmit training data so that the AP can estimate respective space-time streams. Of course, once the MIMO channel is properly estimated, an AP can simultaneously receive station-specific data during an SUT period. For example, the AP uses the estimate of the MIMO channel to decode the data simultaneously transmitted by the stations.

Figure 6B:
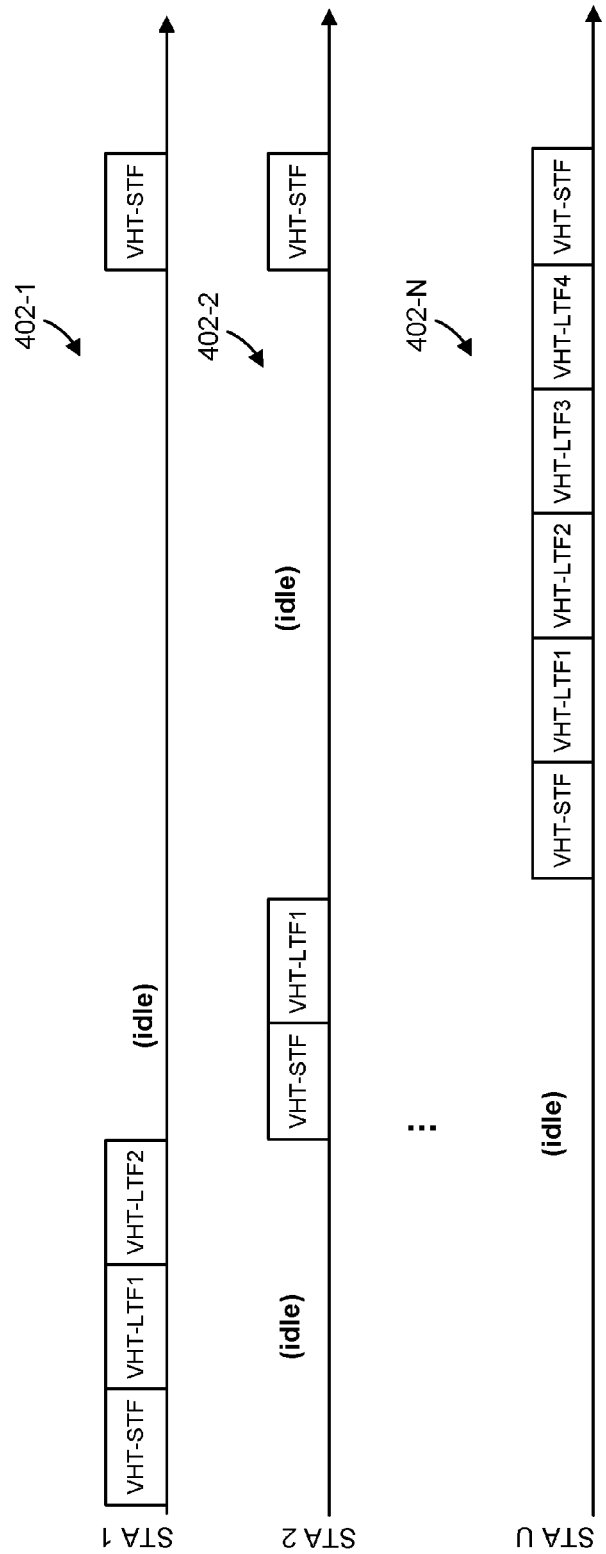
FIG. 6B is a diagram of a portion of a PHY preamble that includes several long training fields for staggered transmission to an AP, according to an embodiment.

FIG. 6B is a timing diagram that illustrates an example staggered approach to estimate a MIMO channel for SUT communications. Stations 1, 2, . . . U transmit PHY preambles having portions 402-1, 402-2, . . . 402-U. In an embodiment, station 1 transmits a short training field VHT-STF followed by two long training fields, while stations 2-U remain idle, i.e., do not transmit data to the AP. Next, station 2 transmits a VHT-STF followed by a VHT-LTF, while all other stations are idle. A cycle of staggered MIMO channel estimation for SUT communications completes when station U transmits a VHT-STF followed by four VHT-LTFs while all other stations are idle, according to the example scenario of FIG. 6B.

In an embodiment, each station transmits at least as many VHT-LTFs as space-time streams assigned to the station by the AP. In some embodiments, the station use the assigned rows of a $P_{VHTLTF}$ (or $P^{(k)}$) matrix when transmitting VHT-LTFs. Similar to the example discussed above, in an embodiment, stations transmit training fields in the order of SUT indexes assigned in the synchronization frame, so that the AP can unambiguously match the received VHT-LTFs to particular stations based on the order or timing of the received VHT-LTFs. Further, a station calculates the duration of the idle period(s) based on the total number of space-time streams $N_{STS\_SUT}$ announced in the synchronization frame, the SUT index and, in some cases, the assignment to space-time streams to other stations, according to an embodiment. For example, station 2 determines the time when station should transmit VHT-STF based on the number of space-time streams assigned to station 1.

According to an embodiment, each station separately transmits the VHT-STF field for automatic gain control (AGC) adjustment. Further, in an embodiment, the stations subsequently transmit another VHT-STF at the same time. In an embodiment, the stations use the first column of the $P^{(k)}$ matrix to jointly transmit a VHT-STF.

If a staggered training technique such as the one illustrated in FIG. 6B is used, an AP applies, according to an embodiment, the following model that describes the received VHT-LTFs at a sub-carrier k:

$$H^{k,(1)}Q_k^{(1)}D_k^{(1)}VHTLTF(k), H^{k,(2)}Q_k^{(2)}D_k^{(2)}$$
$$VHTLTF(k), \ldots, H^{k,(U)}Q_k^{(U)}D_k^{(U)}VHTLTF(k) \quad \text{(Eq. 9)}$$

Upon canceling out the pre defined sequence VHTLTF(k), $P_{VHTLTF}$ inversion, etc., the AP arrives at an estimate of the MIMO channel according to Eq. 10 provided below:

$$H_{EST}^k = [\beta_1 H^{k,(1)}Q_k^{(1)}D_k^{(1)} \ \beta_2 H^{k,(2)}Q_k^{(2)}D_k^{(2)} \ldots$$
$$\beta_U H^{k,(U)}Q_k^{(U)}D_k^{(U)}] \quad \text{(Eq. 10)}$$

In some embodiments, the AP uses the estimate of the MIMO channel to decode the data portions simultaneously transmitted by the stations.

In some embodiments, an AP compensates for the differences in transmit power and AGC settings that may result in column-wise distortion by scaling some of the sub-matrices (e.g., $H^{k,(1)}Q_k^{(1)}D_k^{(1)}$). In an embodiment, the AP considers this distortion factor when implementing interference cancellation and/or data demodulation algorithms.

Figure 6C:
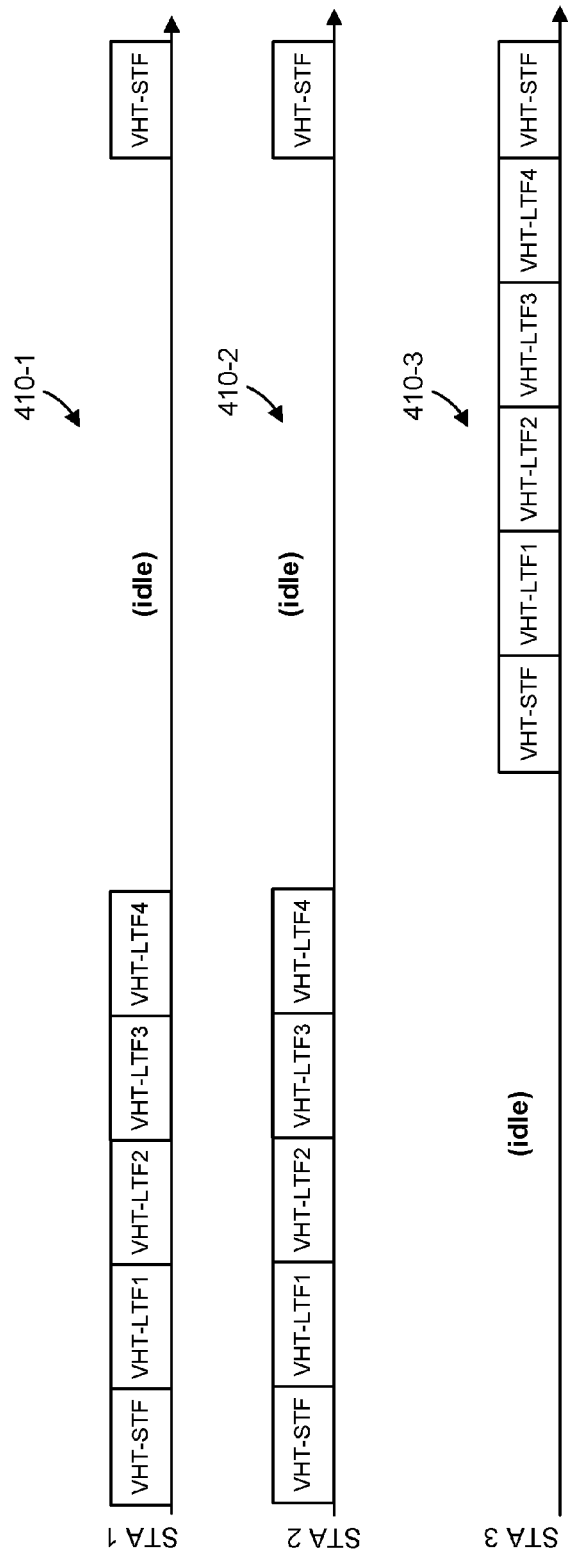
FIG. 6C is a diagram of a portion of a PHY preamble that includes several long training fields for mixed simultaneous/staggered transmission to an AP, according to an embodiment.

Referring to FIG. 6C, stations 1, 2, and 3 in another embodiment utilize a mixed technique that includes both simultaneous VHT-LTF transmissions and staggered VHT-LTF transmissions. Stations 1 and 2 simultaneously transmit a group of four VHT-LTFs in frames 410-1 and 410-2, respectively, while station 3 is idle. Together, stations 1 and 2 form a first group of stations. Next, station 3 transmits four VHT-LTFs in a frame 410-3 while stations 1 and 2 are idle. In this example, station 3 forms a second group of stations. In an embodiment, an AP announces the grouping of stations in a synchronization frame. Using the grouping information, stations can calculate the corresponding idle periods. In an embodiment, each group of stations sends a group-specific VHT-STF for AGC adjustment.

In the example FIG. 6C, an AP applies the following model that describes the received VHT-LTFs at a sub-carrier k:

$$[H^{k,(1)}Q_k^{(1)}D_k^{(1)} \ H^{k,(2)}Q_k^{(2)}D_k^{(2)}]\begin{bmatrix}P_{VHTLTF}^{(1)}\\P_{VHTLTF}^{(2)}\end{bmatrix} \cdot VHTLTF(k), \text{ and} \quad \text{(Eq. 11A)}$$

$$H^{k,(3)}Q_k^{(3)}D_k^{(3)}VHTLTF(k) \quad \text{(Eq. 11B)}$$

According, the AP estimates the channel according to Eq. 12:

$$H_{EST}^k = [\beta_1 H^{k,(1)}Q_k^{(1)}D_k^{(1)} \ \beta_2 H^{k,(2)}Q_k^{(2)}D_k^{(2)} \ \beta_3 H^{k,(3)}$$
$$Q_k^{(3)}D_k^{(3)}] \quad \text{(Eq. 12)}$$

In some embodiments, the AP uses the estimate of the MIMO channel to decode the data portions simultaneously transmitted by the stations.

As discussed above, in some cases stations provide station-specific PHY parameters to the AP in a VHT-SIG field. Several techniques for generating a VHT-SIG field are discussed next with reference to FIGS. 7 and 8.

Figure 7:
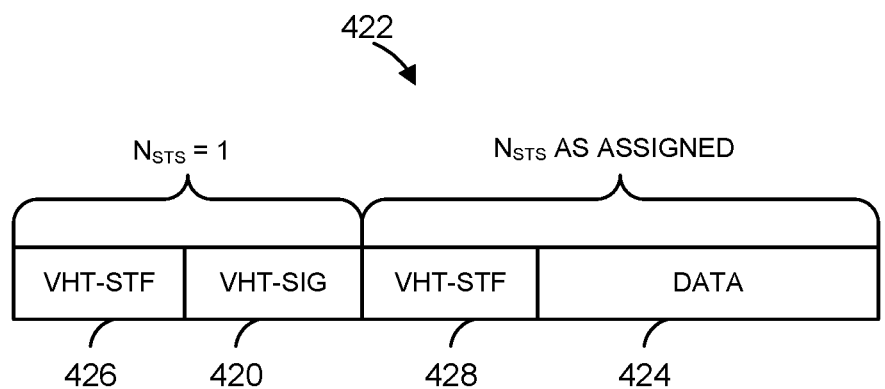
FIG. 7 is a diagram of a portion of a communication frame in which a VHT signaling portion is transmitted using a single space-time stream, and a data portion is transmitted using multiple space-time streams, according to an embodiment.

Referring first to FIG. 7, in an embodiment, a station modulates a VHT-SIG field 420 of a communication frame 422 with binary phase-shift keying (BPSK), binary convolution codes (BCC), and one space-time stream (i.e., $N_{STS}=1$). When an AP simultaneously receives several instances of the VHT-SIG field 420 from several stations, the AP multiplexes the received signal to interpret and process station-specific PHY parameters. In an embodiment, each station uses the first column of the corresponding spatial mapping matrix Q to spatially map the VHT-SIG field 420. Referring back to FIGS. 5A-C, stations can similarly apply the first column of the spatial mapping matrix to the field VHT-SIG2 in the corresponding VHT portion 312 or 330. In the embodiments, the received VHT-SIG field is given by:

$$r_{VHT-SIG}^{(u)}(t) = \quad \text{(Eq. 13)}$$
$$\frac{1}{\sqrt{N_{VHT-SIG}^{Tone}}} w_{T_{VHT-SIG}}(t) \cdot \cdot \sum_{k=-N_{SR}}^{N_{SR}} [Q_k^{(u)}]_{i_{TX}^{(u)},1} \gamma_k VHTLTF(k) \cdot$$
$$\exp(j2\pi k \Delta_F(t - T_{GI} - T_{CS}^{i_{STS},(u)}))$$

With continued reference to FIG. 7, a data portion 424 of the communication frame 422 in some cases is transmitted over more than one space-time stream. For example, in an embodiment, the number of space-time streams $N_{STS}$ is specified in the synchronization frame from the AP.

In an embodiment, to properly adjust AGC, the short training field VHT-STF 426 is transmitted with $N_{STS}=1$ using the element in the first row, first column of the $P^{(k)}$ matrix, and VHT-STF 428 is transmitted with $N_{STS}=N_{STS\_DATA}$ using the first column of the $P^{(k)}$ matrix. In some embodiments, the VHT-STF 426 (i.e., a short training field that precedes the VHT-SIG) is omitted when a sequence of VHT-LTFs is followed by a VHT-STF field (see FIGS. 6A-C, for example).

In an embodiment, a VHT-STF transmitted with $N_{STS}=N_{STS\_DATA}$ is mapped to $N_{STS}$ space-time streams using the first or the last column of the $P^{(k)}$ matrix, and the resulting space-time streams are mapped to $N_{TX}$ transmit antennas using the Q matrix. The received VHT-SIG accordingly is given by:

$$r_{VHT-SIG}^{(u)}(t) = \frac{1}{\sqrt{N_{STS}^{(u)} N_{VHT-SIG}^{Tone}}} w_{T_{VHT-SIG}}(t) \cdot \cdot \quad \text{(Eq. 14)}$$
$$\sum_{k=-N_{SR}}^{N_{SR}} \sum_{i_{STS}=1}^{N_{STS}^{(u)}} [Q_k^{(u)}]_{i_{TX}^{(u)},i_{STS}} [P_{VHTLTF}^{(u)}]_{i_{STS},n} \gamma_k VHTSIG(k) \cdot \cdot$$
$$\exp(j2\pi k \Delta_F(t - T_{GI} - T_{CS}^{i_{STS},(u)}))$$

Further, it is noted that an AP in this case can expect little power fluctuation between a VHT-SIG field and a data field (e.g., the fields 428 and 424, respectively), and thus no additional VHT-SIG field is needed at least in some implementations and/or scenarios.

Figure 8:
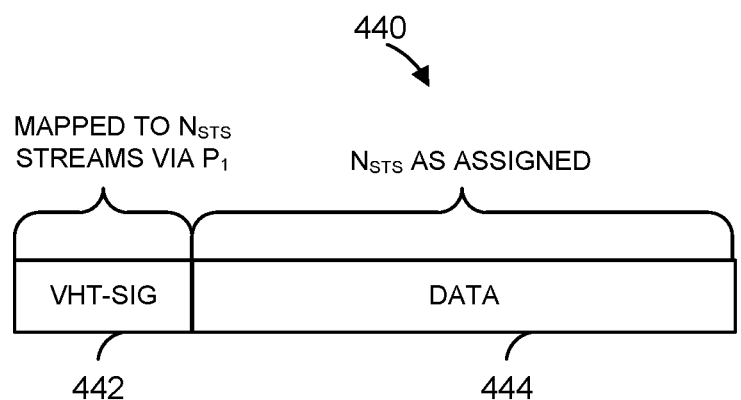
FIG. 8 is a diagram of a portion of a communication frame in which a VHT signaling portion and a data portion are transmitted using multiple space-time streams, according to an embodiment.

Referring to FIG. 8, a communication frame includes a portion 440 in which a VHT-SIG field 442 is mapped to $N_{STS}$ streams using the first ($P_1$) column of the matrix $P^{(k)}$. Accordingly, the AP (or another receiver) applies the vector $P_1$ when processing VHT-SIGs received from different stations.

In another embodiment, a VHT-SIG field is modulated using BPSK using the same number of space-time streams as applied to the data portion of the frame. In this case, stations need not transmit another VHT-STF field. In an embodiment, if two OFDM symbols are required to modulate the VHT-SIG field over one space-time stream, a single OFDM symbol is used to modulate the VHT-SIG field over two or more space-time streams. Further, because the AP knows the number of space-time streams allocated to a particular station, the AP can automatically detect the modulation scheme.

Figure 9:
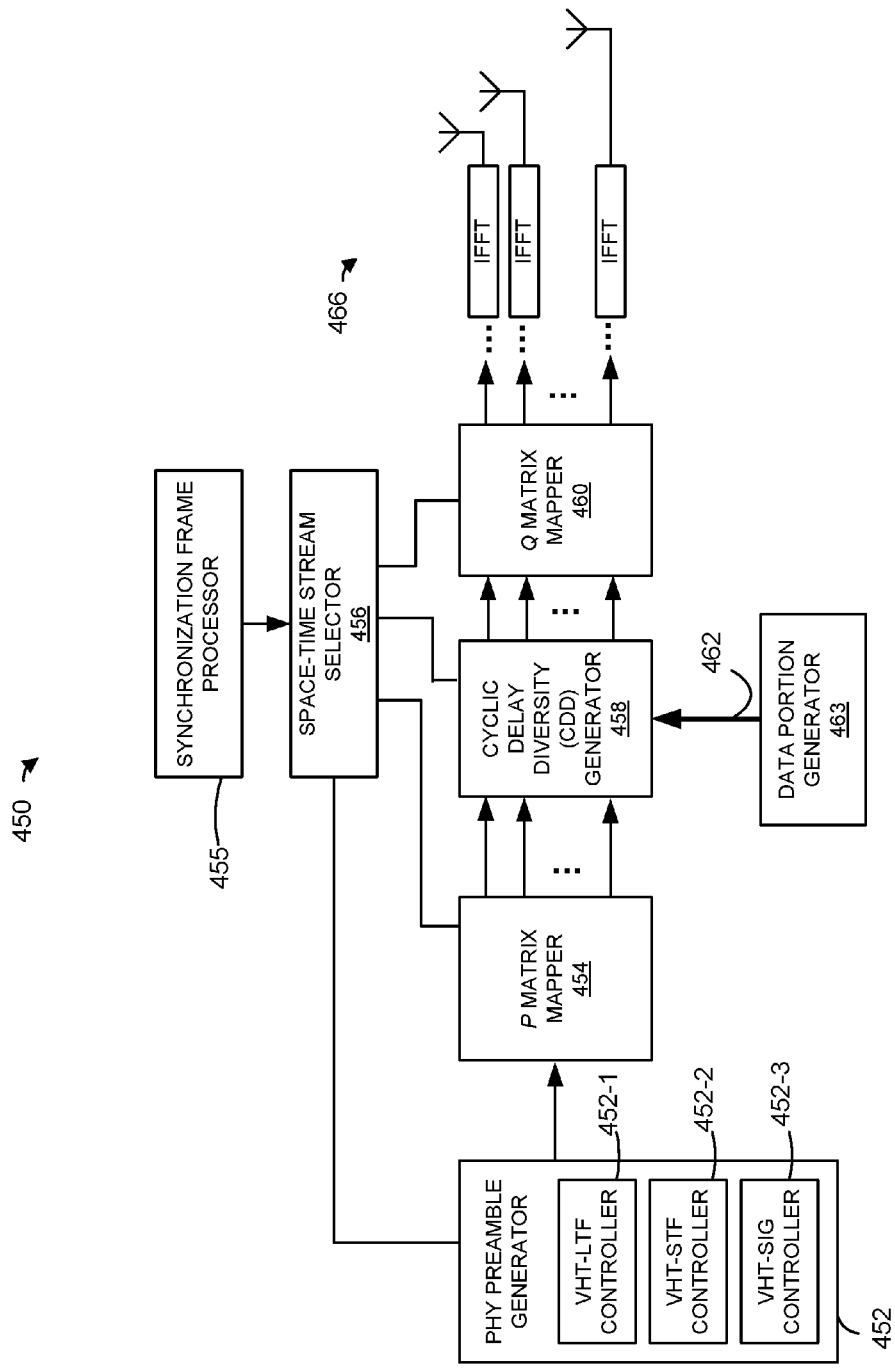
FIG. 9 is a block diagram of a communication frame generator that is used in an SUT-capable station, according to an embodiment.

Now referring to FIG. 9, an example communication frame generator 450 operates in the network interface 27 of the client 25-1, for example, or in another SUT-capable client station. In an embodiment, some components of the frame generator 450 can be included in the MAC unit 28, while other components of the frame generator 450 can be included in the PHY unit 29. The communication frame generator 450 generates communication frames so as to communicate within an SUT time period according to a protocol discussed with reference to FIGS. 4A-C, for example. In an embodiment, these frames conform to one of the overall formats illustrated in FIGS. 5A-C. Further, in an embodiment, the specific fields or groups of fields (e.g., VHT-LTF sequences, VHT-SIG, etc.) in these frames are consistent with the examples of FIG. 6A-C, 7, or 8.

In an embodiment, the frame generator 450 includes a PHY preamble generator 452 having a VHT-LTF controller 452-1 to produce symbols of a long training field, a VHT-STF controller 452-2 to produce sequences of a short training field, and a VHT-SIG controller 452-2 to produce a field that signals PHY parameters to another device (e.g., an AP). The PHY preamble generator 452 supplies VHT-STF, VHT-LTF, and VHT-SIG fields to a P matrix mapper 454 that maps symbols to space-time streams. The P matrix mapper 454 applies a mapping scheme in accordance with a selection signal generated by a space-time stream selector 456. In this manner, the space-time stream selector enables the station to operate as an SUT-capable station and transmit uplink data to an AP simultaneously with other stations. In an embodiment, the space-time stream 456 selects particular rows of a matrix $P^{(k)}$ to be applied to a field of a PHY preamble. In an embodiment, the space-time stream selector 456 selects the rows of the matrix $P^{(k)}$ in view of the information supplied in a synchronization and processed by a synchronization frame processor 455.

The outputs of the P matrix mapper 454 are coupled to respective inputs of a CDD generator 458 that applies frequency cyclic delay diversity values to the corresponding space-time streams. In an embodiment, the block controller 456 additionally controls the selection of values by the CDD generator 458. In an embodiment, the CDD generator 458 additionally receives a data payload via a line 462 from a data portion generator 463.

The outputs of the CDD generator 458 are coupled to a Q matrix mapper 460 that performs spatial mapping of space-time streams to transmit chains 466, each including at least a respective transmit antenna. Similar to the P matrix mapper 454, the Q matrix mapper 460 is communicatively coupled to the space-time stream selector 456 that selects an appropriate matrix Q for various fields of the communication frames.

Figure 10:
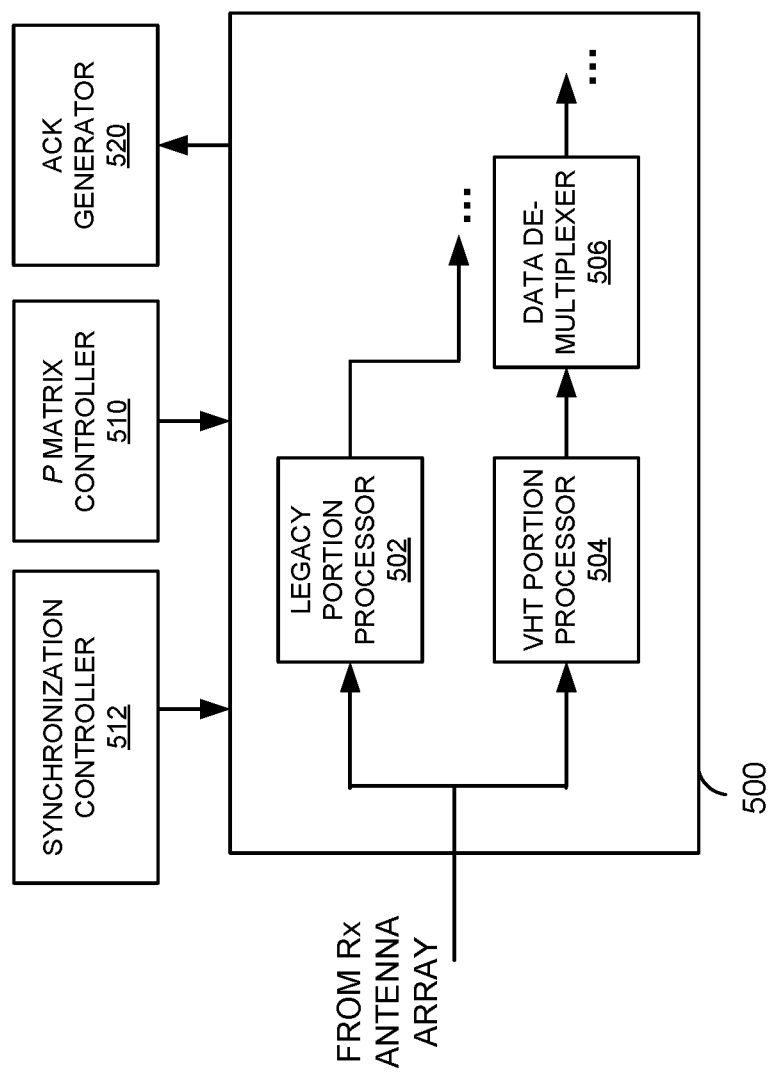
FIG. 10 is a block diagram of a communication frame processor that is used in an SUT-capable AP, according to an embodiment.

FIG. 10 illustrates an example SUT communication frame processor 500 that operates in the AP 14 or a similar device configured to receive communication frames. The SUT communication frame processor 500 includes a legacy portion processor 502 and a VHT portion processor 504. To demultiplex (separate) station-specific data transmitted in several concurrent communication frames, a data demultiplexer 506 applies appropriate vectors to the received signal. In an embodiment, the data demultiplexer 506 cooperates with a P matrix controller 510 and/or a synchronization controller 512. In particular, the P matrix controller 510 and the synchronization controller 512 in some embodiments allocate space-time streams to individual stations, assign SUT indexes to stations, control the timing of an SUT time period, etc. Thus, for example, the data demultiplexer 506 retrieves the mapping of stations to individual space-time streams or groups of space-time streams of a MIMO channel used in SUT communications from the synchronization controller 512, retrieves the appropriate shared $P^{(k)}$ matrix from the P matrix controller 510, and uses this information to demultiplex the received data.

In an embodiment, the communication frame processor 500 is communicatively coupled to an acknowledgment generator 520 that generates ACKs or NACKs individually or according to a block format (see FIGS. 4A-C and the corresponding discussion).

Figure 11:
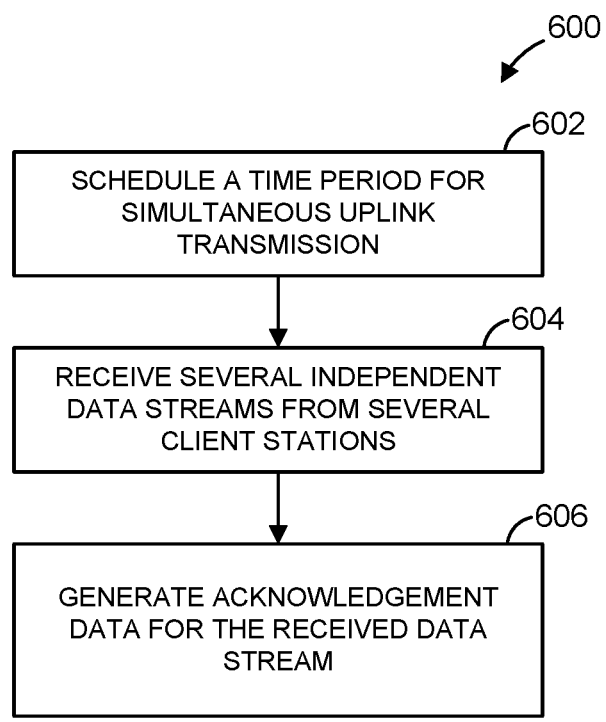
FIG. 11 is a flow diagram of an example method for scheduling an SUT time period and communicating within the scheduled SUT time period in accordance with an embodiment of the present disclosure.

Referring to FIG. 11, a method 600 for scheduling a SUT time period and communicating with several SUT-capable stations within the SUT period is implemented by the synchronization frame controller 512 or by a similar component of an AP, according to an embodiment. At block 602, a time period for SUT communications is scheduled in view of such factors as client station compatibility, client station capabilities, bandwidth requirements, etc. The AP excludes legacy stations from the SUT time period and allows only SUT-capable stations during this period. Depending on the embodiment, the AP sets the duration of intervals Tu, Td, etc. In an embodiment, the AP determines the maximum length of a SUT communication frame. Upon scheduling an SUT time period, the AP assigns space-time streams to individual stations, assigns SUT indexes to stations, and generates other system-wide or station-specific PHY parameters, according to an embodiment. The AP then transmits a synchronization frame to two or more stations to announce the scheduling of the SUT time period as well as the relevant parameters.

At block 604, the AP simultaneously receives several SUT communication frames. As discussed above, the communication frames in some embodiments include both legacy and VHT portions. In an embodiment, the AP estimates the MIMO channel between the AP and the virtual transmit antenna array defined by two or more SUT-capable stations using PHY preambles of the received communication frames. In at least some of the embodiments, the AP demultiplexes station-specific portions of communication frames in view of the previously defined space-time mapping. In some embodiments, the received communication frames include station-specific PHY parameters not assigned or controlled by the AP. In some embodiments, the estimate of the MIMO channel is used by the AP to decode data simultaneously transmitted by the stations in the communication frames.

At block 606, the AP generates one or several acknowledgement frames. In an embodiment, the one or several acknowledgement frames are transmitted at the end of the SUT period. In one embodiment, the AP generates and broadcasts a single "block" acknowledgement frame that identifies each station from which a SUT communication frame has been successfully received. In another embodiment, the AP generates and transmits a plurality of individual acknowledgement frames to each station from which a SUT communication frame has been successfully received, At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for use in a communication system including (i) an access point having a plurality of antennas, and (ii) a plurality of communication devices, wherein a multiple-input, multiple output (MIMO) communication channel corresponds to the plurality of antennas of the access point and respective antennas of the plurality of communication devices, the method comprising:

generating, at the access point, a synchronization data unit to be transmitted by the access point to the plurality of communication devices, wherein the synchronization data unit (i) is for scheduling subsequent simultaneous transmission of a plurality of data units by communication devices among the plurality of communication devices, and (ii) specifies respective sets of spatial streams, among a plurality of spatial streams, that respective communication devices among the plurality of communication devices are to use when transmitting respective data units among the plurality of data units;

receiving, at the access point, a signal via the plurality of antennas, wherein the signal corresponds to the plurality of data units transmitted simultaneously from the respective communication devices among the plurality of communication devices via the respective sets of sets of spatial streams;

generating an estimate of the MIMO communication channel using i) a plurality of training fields included in a first portion of the signal and ii) a matrix that indicates a mapping of the plurality of training fields over the plurality of spatial streams, wherein respective submatrices of the matrix correspond to the respective communication devices; and decoding data in a second portion of the signal using the estimate of the MIMO communication channel, wherein the data in the second portion of the signal corresponds to data included in the plurality of data units.

2. The method of claim 1, further comprising generating, at the access point, respective acknowledgement data units for respective data units among the plurality of data units.

3. The method of claim 1, further comprising generating a single acknowledgement data unit that indicates data units among the plurality of data units that were successfully decoded.

4. The method of claim 1, wherein generating the synchronization data unit comprises generating the synchronization data unit to indicate at least one of:

a duration of a time period during which the plurality of communication devices can simultaneously transmit the plurality of data units;

a maximum length of a data unit that can be transmitted by the plurality of communication devices in response to the synchronization data unit; and a time interval between the transmission of the synchronization data unit and the transmission of the plurality of data units.

5. The method of claim 1, wherein generating the synchronization data unit comprises generating the synchronization data unit to indicate respective modulation and coding schemes (MCSs) that respective communication devices among the plurality of communication devices are to use when transmitting respective data units among the plurality of data units.

6. The method of claim 1, wherein generating the synchronization data unit comprises generating the synchronization data unit to indicate respective amounts of bandwidth allocated to respective communication devices among the plurality of communication devices for transmitting respective data units among the plurality of data units.

7. The method of claim 1, further comprising scheduling a time period during which the plurality of communication devices are to simultaneously transmit the plurality of data units;

wherein generating the synchronization data unit comprises generating the synchronization data unit to specify the scheduled time period.

8. An apparatus for use in a communication system including (i) an access point having a plurality of antennas, and (ii) a plurality of communication devices, wherein a multiple-input, multiple output (MIMO) communication channel corresponds to the plurality of antennas of the access point and respective antennas of the plurality of communication devices, the apparatus comprising:

a network interface device having one or more integrated circuits configured to generate a synchronization data unit to be transmitted by the access point to the plurality of communication devices, wherein the synchronization data unit (i) is for scheduling subsequent simultaneous transmission of a plurality of data units by communication devices among the plurality of communication devices, and (ii) specifies respective sets of spatial streams, among a plurality of spatial streams, that respective communication devices among the plurality of communication devices are to use when transmitting respective data units among the plurality of data units, generate an estimate of the MIMO communication channel using i) plurality of training fields included in a first portion of a signal and ii) a matrix that indicates a mapping of the plurality of training fields over the plurality of spatial streams, wherein respective submatrices of the matrix correspond to the respective communication devices, and wherein the signal is received via the plurality of antennas and corresponds to the plurality of data units transmitted simultaneously from the respective communication devices among the plurality of communication devices via the respective sets of sets of spatial streams, and decode data in a second portion of the signal using the estimate of the MIMO communication channel, wherein the data in the second portion of the signal corresponds to data included in the plurality of data units.

9. The apparatus of claim 8, wherein the one or more integrated circuit devices are configured to generate respective acknowledgement data units for respective data units among the plurality of data units.

10. The apparatus of claim 8, wherein the one or more integrated circuit devices are configured to generate a single acknowledgement data unit that indicates data units among the plurality of data units that were successfully decoded.

11. The apparatus of claim 8, wherein the one or more integrated circuit devices are configured to generate the synchronization data unit to indicate at least one of:
 a duration of a time period during which the plurality of communication devices can simultaneously transmit the plurality of data units;
 a maximum length of a data unit that can be transmitted by the plurality of communication devices in response to the synchronization data unit; and
 a time interval between the transmission of the synchronization data unit and the transmission of the plurality of data units.

12. The apparatus of claim 8, wherein the one or more integrated circuit devices are configured to generate the synchronization data unit to indicate respective modulation and coding schemes (MCSs) that respective communication devices among the plurality of communication devices are to use when transmitting respective data units among the plurality of data units.

13. The apparatus of claim 8, wherein the one or more integrated circuit devices are configured to generate the synchronization data unit to indicate respective amounts of bandwidth allocated to respective communication devices among the plurality of communication devices for transmitting respective data units among the plurality of data units.

14. The apparatus of claim 8, wherein the one or more integrated circuit devices are configured to:
 schedule a time period during which the plurality of communication devices are to simultaneously transmit the plurality of data units, and
 generate the synchronization data unit to specify the scheduled time period.

15. The apparatus of claim 8, wherein the network interface device comprises:
 a physical layer processor device implemented on the one or more integrated circuits; and
 a media access control processor device implemented on the one or more integrated circuits.

16. The apparatus of claim 8, wherein the network interface device comprises a plurality of transceivers implemented on the one or more integrated circuits.

17. The apparatus of claim 16, further comprising the plurality of antennas, wherein the plurality of antennas are coupled to the plurality of transceivers.

18. The apparatus of claim 8, wherein the network interface device comprises a processor that executes machine readable instructions, wherein the processor is implemented on the one or more integrated circuits.

* * * * *